United States Patent
Sasaki

(10) Patent No.: US 7,365,301 B2
(45) Date of Patent: Apr. 29, 2008

(54) THREE-DIMENSIONAL SHAPE DETECTING DEVICE, IMAGE CAPTURING DEVICE, AND THREE-DIMENSIONAL SHAPE DETECTING PROGRAM

(75) Inventor: Hiroyuki Sasaki, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 148 days.

(21) Appl. No.: 11/431,033

(22) Filed: May 10, 2006

(65) Prior Publication Data
US 2006/0219869 A1    Oct. 5, 2006

Related U.S. Application Data

(63) Continuation-in-part of application No. PCT/JP2004/016632, filed on Nov. 10, 2004.

(30) Foreign Application Priority Data
Nov. 11, 2003   (JP) ............................. 2003-381104

(51) Int. Cl.
*H01L 27/00* (2006.01)
(52) U.S. Cl. .................... 250/208.1; 382/203; 356/601
(58) Field of Classification Search ............. 250/208.1, 250/559.19, 559.22, 559.27, 559.24, 559.29, 250/559.38, 559.39, 559.05, 559.07; 382/154, 382/199, 203; 345/419–427; 356/601–613
See application file for complete search history.

(56) References Cited

U.S. PATENT DOCUMENTS

| 5,668,631 | A | * | 9/1997 | Norita et al. ............... 356/608 |
| 6,243,165 | B1 | | 6/2001 | Norita et al. |
| 6,407,817 | B1 | | 6/2002 | Norita et al. |
| 6,449,004 | B1 | | 9/2002 | Okisu et al. |
| 6,480,288 | B1 | | 11/2002 | Fujii et al. |
| 6,522,412 | B2 | | 2/2003 | Norita et al. |
| 6,674,534 | B2 | | 1/2004 | Norita et al. |

(Continued)

FOREIGN PATENT DOCUMENTS

EP    1067362 A1    1/2001

(Continued)

*Primary Examiner*—Davienne Monbleau
*Assistant Examiner*—Francis M LeGasse, Jr.
(74) *Attorney, Agent, or Firm*—Baker Botts L.L.P.

(57) ABSTRACT

A three-dimensional shape detecting device comprising projection means which projects pattern light, image capturing means which captures a pattern light projection image of a subject on which the pattern light is projected, and a three-dimensional shape calculation means which calculates a three-dimensional shape of the subject based on a locus of the pattern light extracted from the pattern light projection image. The device further comprises a first area setting means which sets a first area, including a first portion of the locus of the pattern light extending in an X-axis direction of the pattern light projection image, in the pattern light projection image; a first detecting means which detects a plurality of pixels forming the first portion of the locus of the pattern light in the first area; an approximated curve calculation means which calculates an approximated curve regarding the locus of the pattern light based on the plurality of pixels; and second area setting means which sets a second area for detecting pixels forming a second portion of the locus of the pattern light in the pattern light projection image, based on the approximated curve. The extracted locus of the pattern light is based on the plurality of pixels detected by the first detecting unit and the pixels detected in the second area.

11 Claims, 19 Drawing Sheets

U.S. PATENT DOCUMENTS

| | | |
|---|---|---|
| 6,775,010 B2 | 8/2004 | Fujii et al. |
| 2002/0113946 A1 | 8/2002 | Kitaguchi et al. |

FOREIGN PATENT DOCUMENTS

| | | |
|---|---|---|
| JP | 19953282331 B2 | 3/2002 |
| JP | 2003504947 A | 2/2003 |
| JP | 200378725 A | 3/2003 |
| JP | 2003106826 A | 4/2003 |
| JP | 19973493886 B2 | 11/2003 |
| WO | 0104571 A1 | 1/2001 |

* cited by examiner

FIG. 1
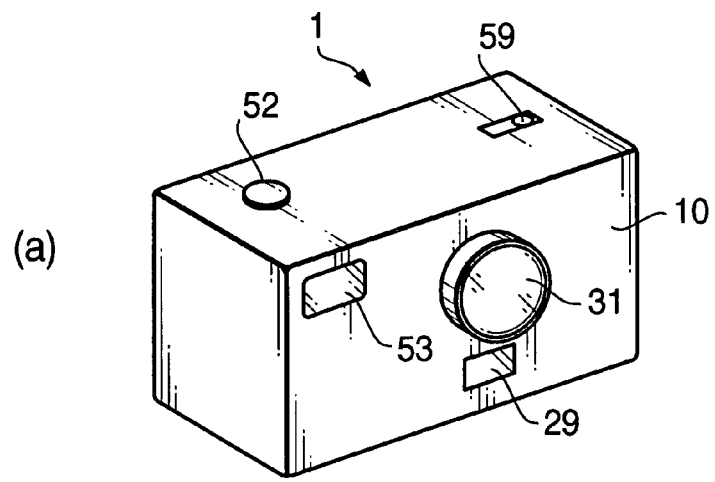
(a)
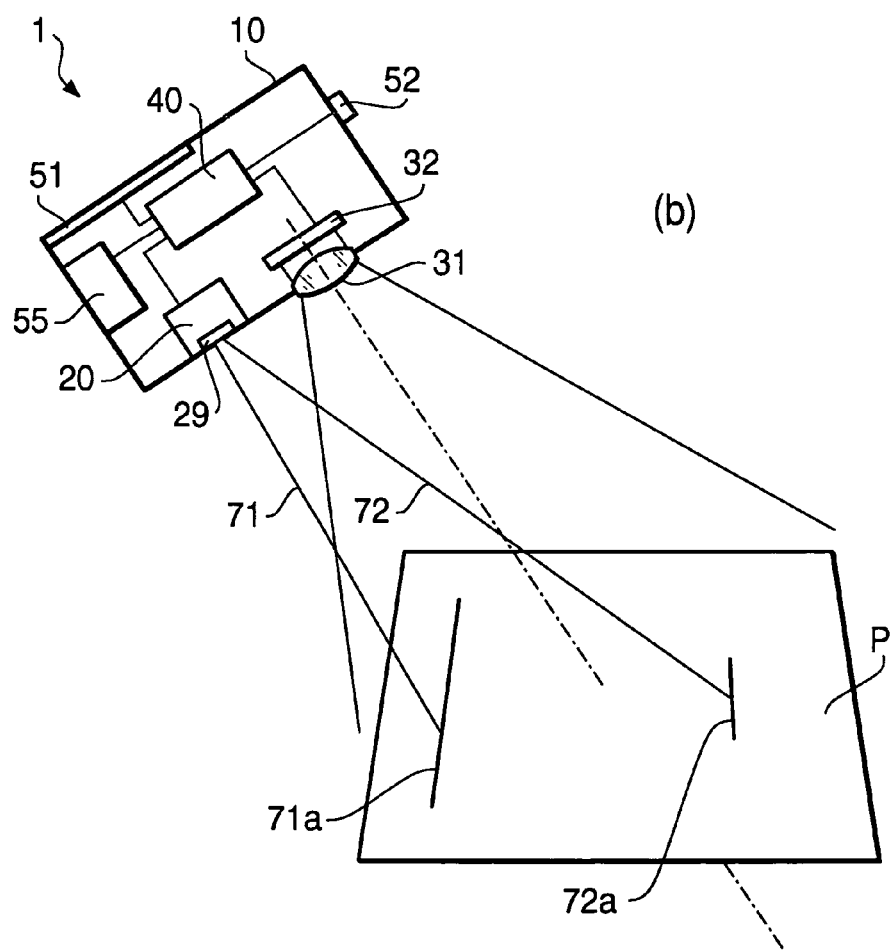
(b)

FIG.17
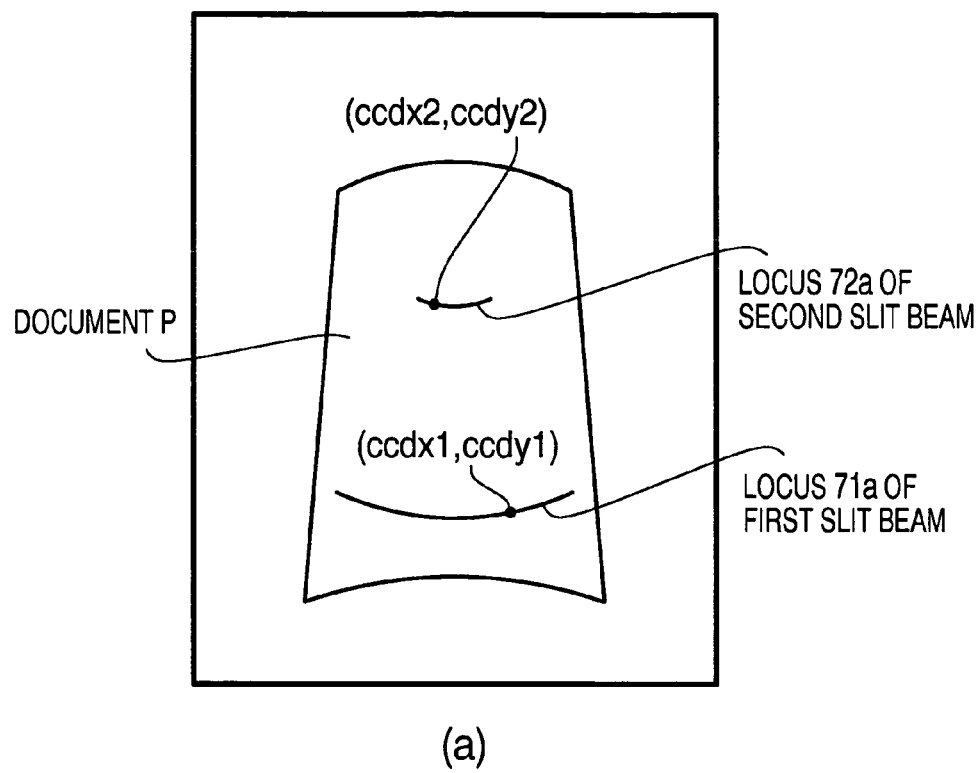
(a)
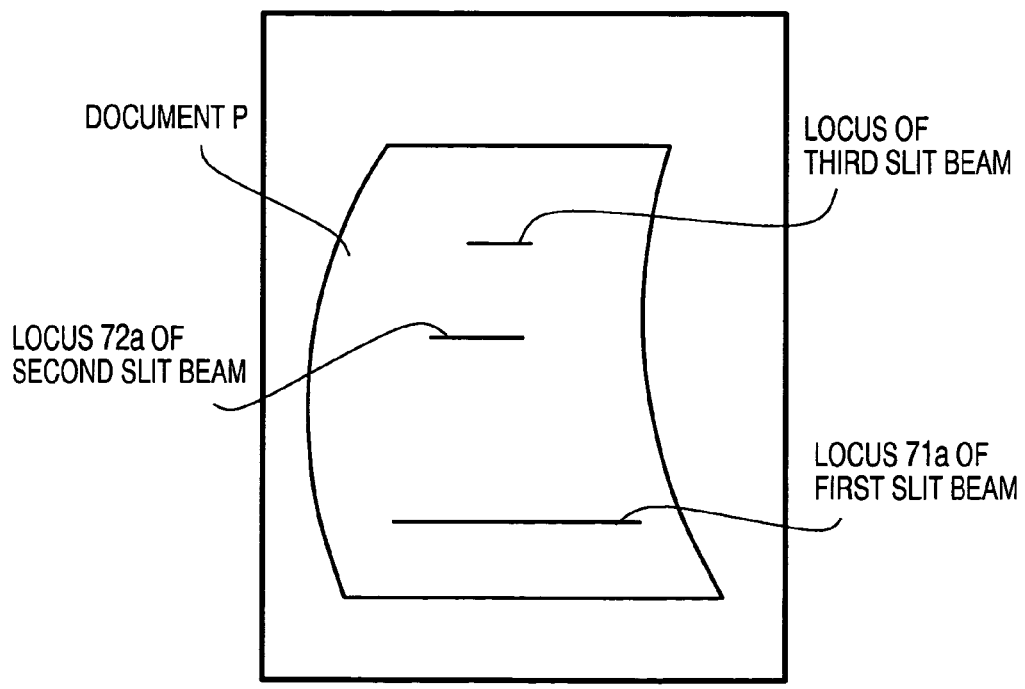
(b)

FIG.18
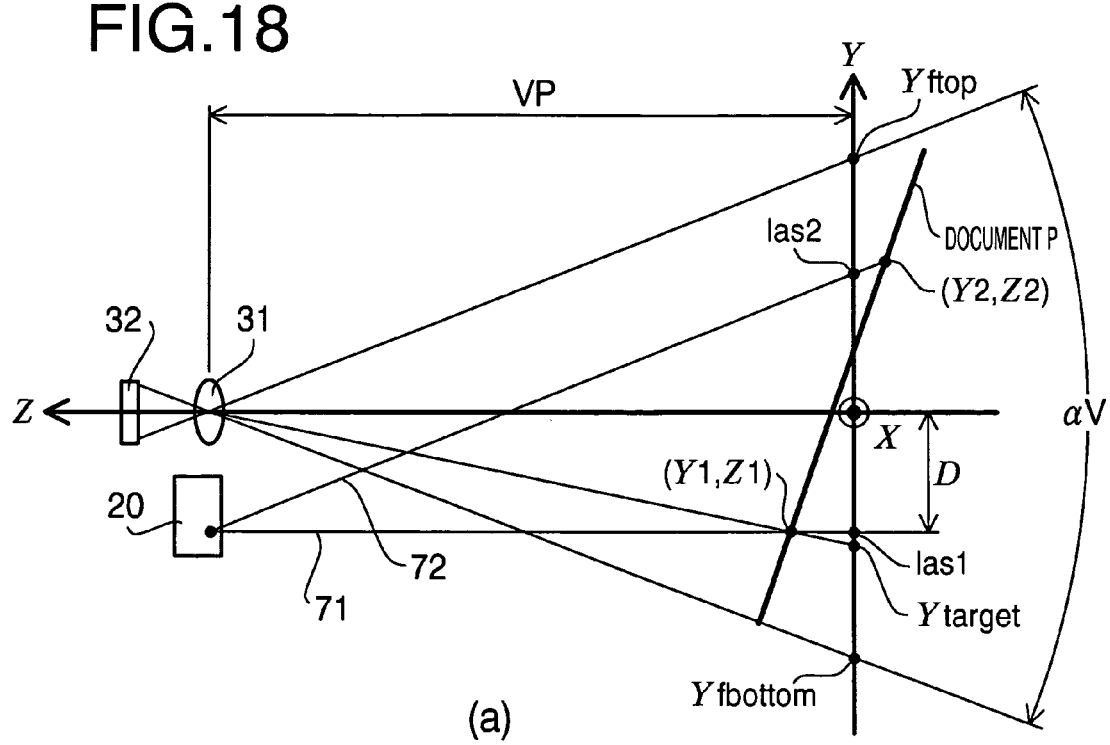
(a)
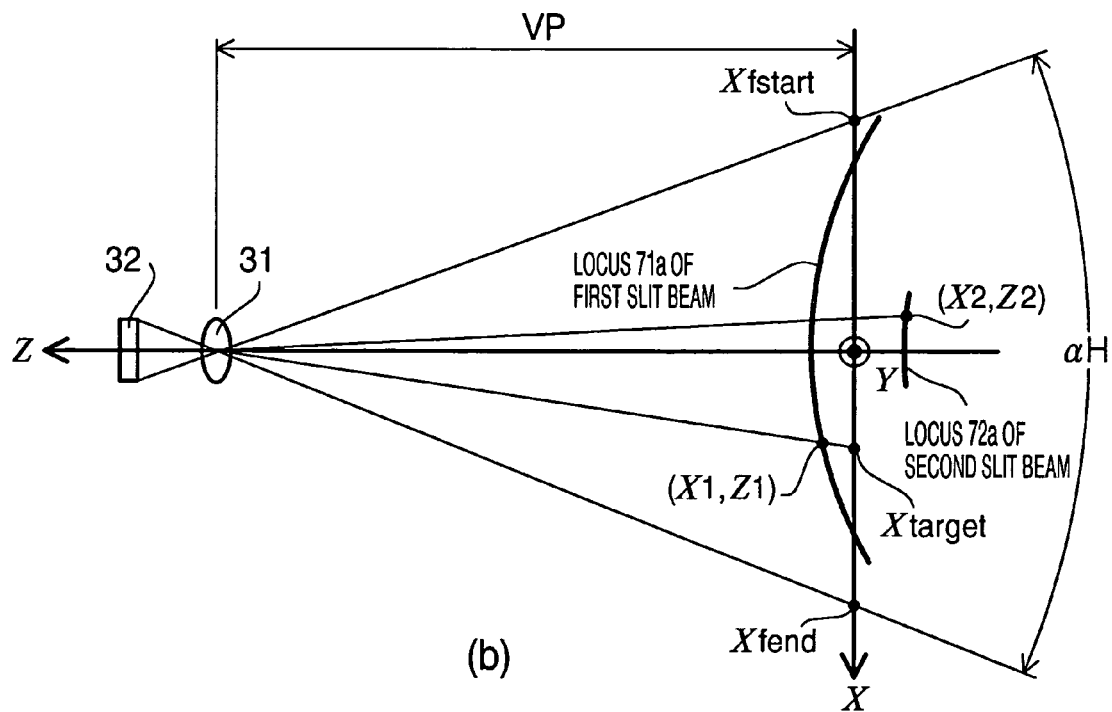
(b)

FIG.19
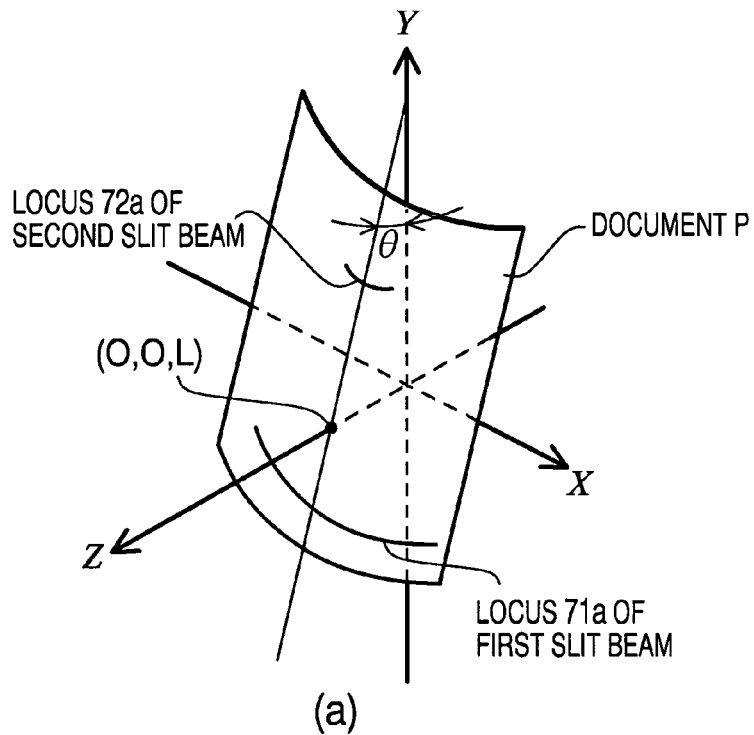
(a)
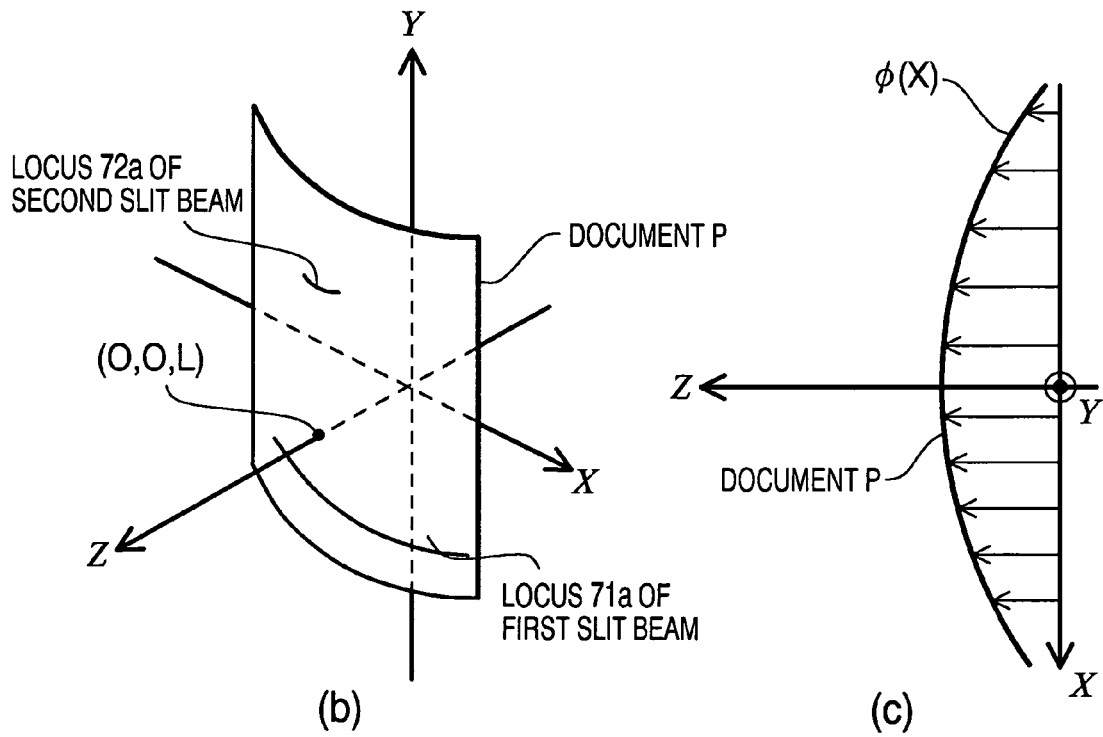
(b)　　　　　　　　　　(c)

1

THREE-DIMENSIONAL SHAPE DETECTING DEVICE, IMAGE CAPTURING DEVICE, AND THREE-DIMENSIONAL SHAPE DETECTING PROGRAM

TECHNICAL INVENTION

The present invention relates to a three-dimensional shape detecting device, an image capturing device and a three-dimensional shape detecting program for detecting the three-dimensional shape of a subject by use of pattern light.

BACKGROUND OF THE INVENTION

An image capturing device, equipped with a correction means capable of correcting a captured image (an image of a subject such as a white board, a book, etc. captured by the device) as if the subject were shot from the front even when the subject is shot from a direction oblique to the front of the subject, is well known today. Such a correction means makes the correction by detecting the three-dimensional shape of the subject based on the captured image of the subject. A portable digital camera equipped with such a correction means has been disclosed in, for example, FIG. 1, etc. of Japanese Patent Provisional Publication No.HEI09-289611 (hereinafter referred to as a "document No. 1").

As an example of a technique for detecting the three-dimensional shape of the subject as parameters necessary for the aforementioned correction means, a three-dimensional shape measurement device of a stationary type, extracting slit beams (as an example of pattern light) projected on the subject by subtracting a slit-beamless image (obtained by shooting the subject on which no slit beams are projected) from a slit-beamed image (obtained by shooting the subject on which the slit beams are projected) and detecting the three-dimensional shape of the subject based on the extracted slit beams, has been disclosed in the tenth paragraph, FIG. 3, etc. of Japanese Patent Publication No.3282331 (hereinafter referred to as a "document No.2").

DISCLOSURE OF THE INVENTION

The three-dimensional shape measurement device mentioned above is a device of the stationary type and thus the degree of freedom in image capturing is necessitated to be restricted and that is inconvenient to users. Therefore, three-dimensional shape measurement devices are desired to be portable. However, with a portable three-dimensional shape measurement device, there are cases where a shift or deviation occurs between the shooting position of the slit-beamed image and that of the slit-beamless image due to the so-called "camera shake". In such cases, a shift naturally occurs also between the slit-beamed image and the slit-beamless image, which makes it impossible to extract the slit beams precisely even by the subtraction of the slit-beamless image from the slit-beamed image.

The present invention has been made in order to resolve the above problem. It is therefore the primary object of the present invention to provide a three-dimensional shape detecting device, an image capturing device and a three-dimensional shape detecting program capable of executing the detecting process (for detecting pixels forming a locus of the pattern light from a pattern light projection image) at high speed and with high accuracy.

In order to achieve the above object, an aspect of the present invention provides a three-dimensional shape detecting device comprising projection means which projects pattern light, image capturing means which captures a pattern light projection image of a subject on which the pattern light is projected, and three-dimensional shape calculation means which calculates three-dimensional shape of the subject based on a locus of the pattern light extracted from the pattern light projection image captured by the image capturing means, and being configured as follows: Specifically, the three-dimensional shape detecting device further comprises: first area setting means which sets a first area, including a part of the locus of the pattern light extending in an X-axis direction of the pattern light projection image, in the pattern light projection image; first detecting means which detects a plurality of pixels forming the part of the locus of the pattern light in the first area set by the first area setting means; approximated curve calculation means which calculates an approximated curve regarding the locus of the pattern light based on the plurality of pixels detected by the first detecting means; and second area setting means which sets a second area, for detecting pixels forming remaining part of the locus of the pattern light in the pattern light projection image, based on the approximated curve calculated by the approximated curve calculation means. The locus of the pattern light is extracted based on the plurality of pixels detected by the first detecting means and the pixels detected in the second area set by the second area setting means.

In the three-dimensional shape detecting device configured as above, the second area setting means sets the second area (for detecting the pixels forming the remaining part of the locus of the pattern light) based on the approximated curve regarding the locus of the pattern light. Therefore, the second area is extremely likely to include such pixels and disadvantages such as detecting pixels not forming the pattern light can be reduced, by which the detecting process for detecting the pixels forming the locus of the pattern light in the pattern light projection image can be executed with high accuracy.

In accordance with another aspect of the present invention, there is provided a three-dimensional shape detecting program comprising a three-dimensional shape calculation step of calculating three-dimensional shape of a subject based on a locus of pattern light extracted from a pattern light projection image of the subject captured with the pattern light projected on the subject, and being configured as follows: Specifically, the three-dimensional shape detecting program further comprises: a first area setting step of setting a first area, including a part of the locus of the pattern light, in the pattern light projection image; a first detecting step of detecting pixels forming the part of the locus of the pattern light in the first area set by the first area setting means; an approximated curve calculation step of calculating an approximated curve regarding the locus of the pattern light based on the pixels detected by the first detecting means; and a second area setting step of setting a second area, for detecting pixels forming the remaining part of the locus of the pattern light in the pattern light projection image, based on the approximated curve calculated by the approximated curve calculation means. The locus of the pattern light is extracted based on the pixels detected by the first detecting step and the pixels detected in the second area set by the second area setting step.

With such a three-dimensional shape detecting program, effects similar to those of the aforementioned three-dimensional shape detecting device can be achieved.

BRIEF DESCRIPTION OF THE ACCOMPANYING DRAWINGS

FIG. 1(a) is an external perspective view of an image capturing device.

FIG. 1(b) is a schematic sectional view of the image capturing device 1.

FIGS. 3(a) and 3(b) are schematic diagrams for explaining angular widths of slit beams.

Figure 4:
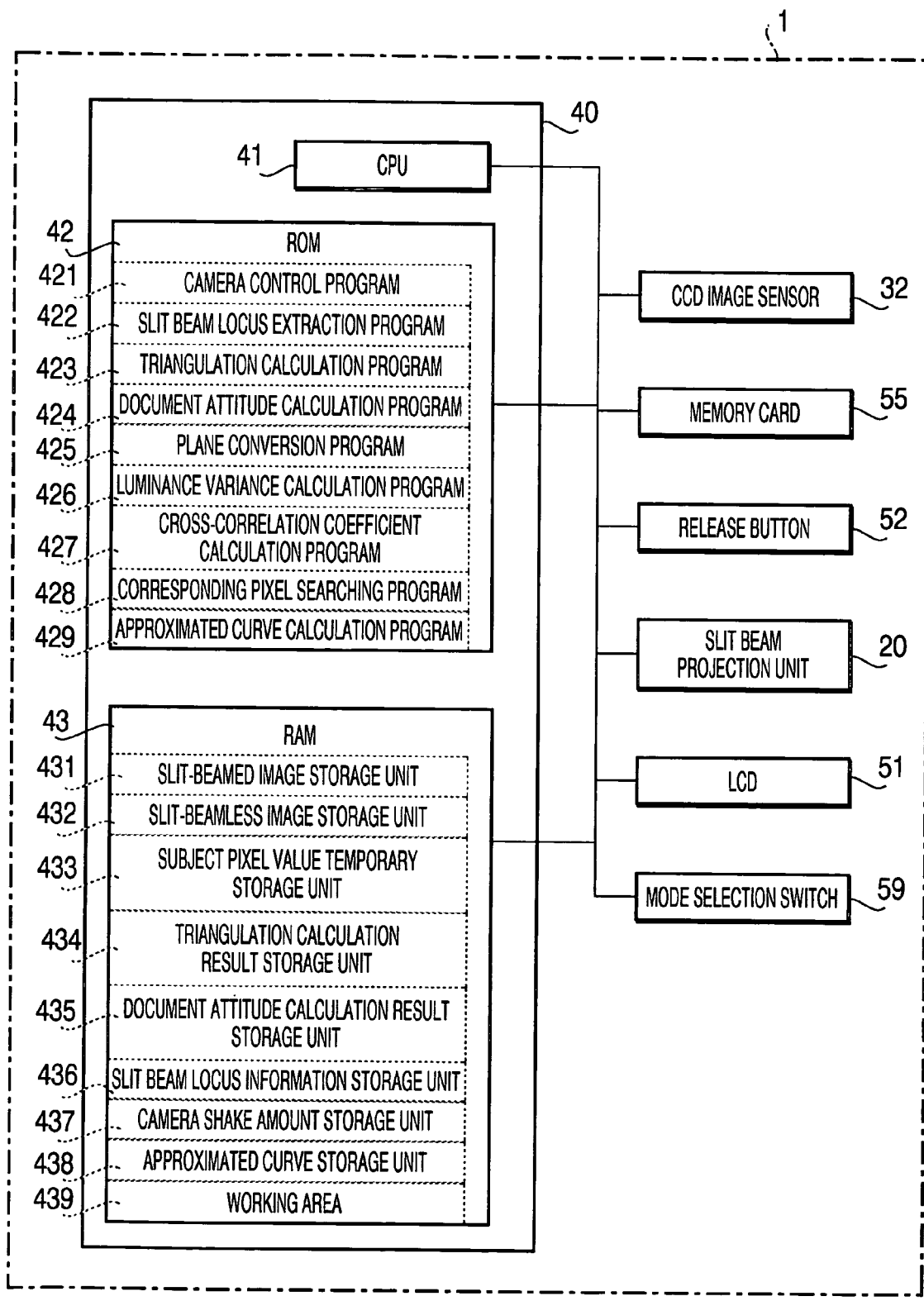

FIG. 4 is a block diagram showing the electrical configuration of the image capturing device.

Figure 5:
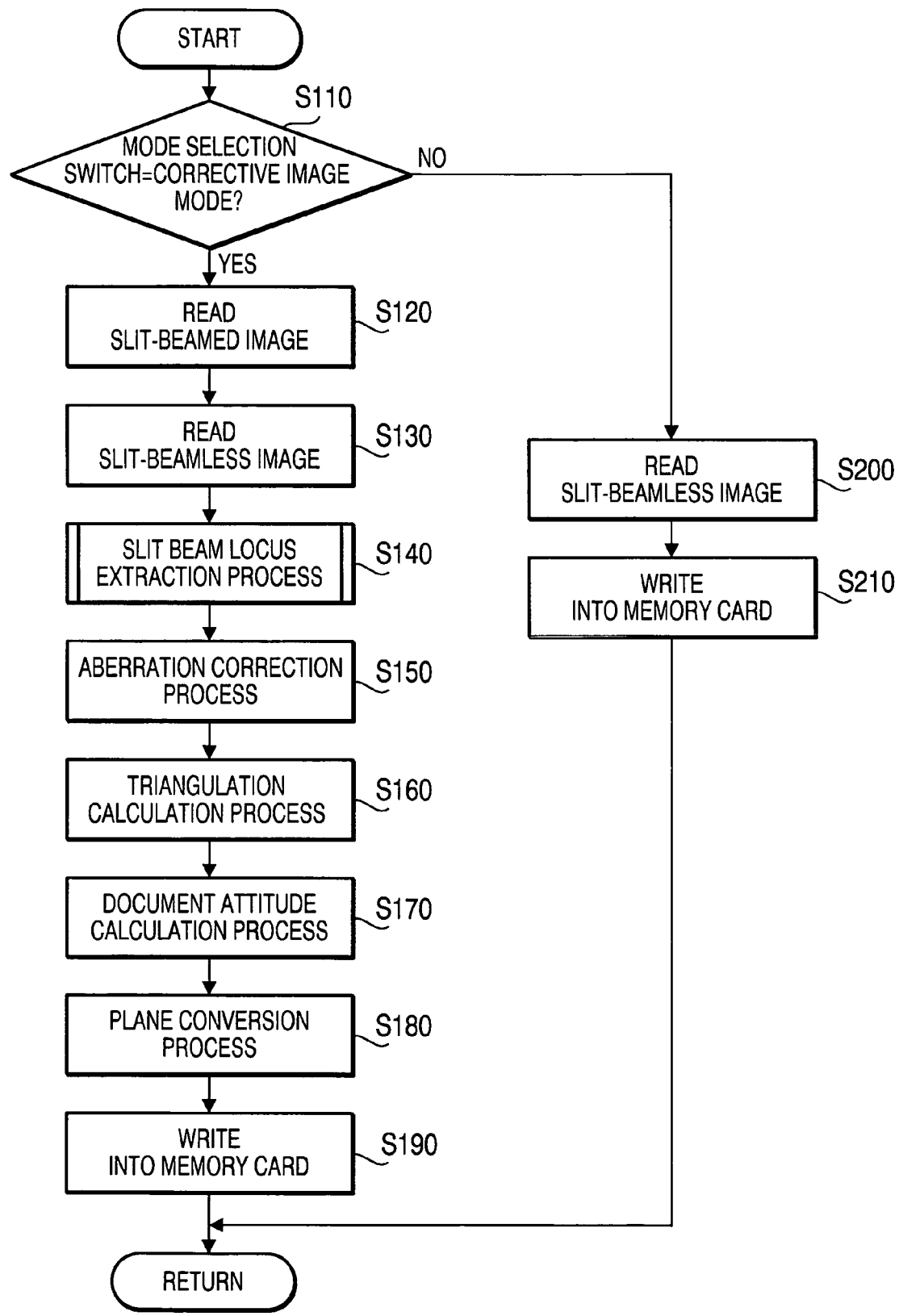

FIG. 5 is a flow chart showing a process executed by a processor.

FIGS. 6(a) and 6(b) are schematic diagrams for explaining the principle of a slit beam locus extraction process.

Figure 7:
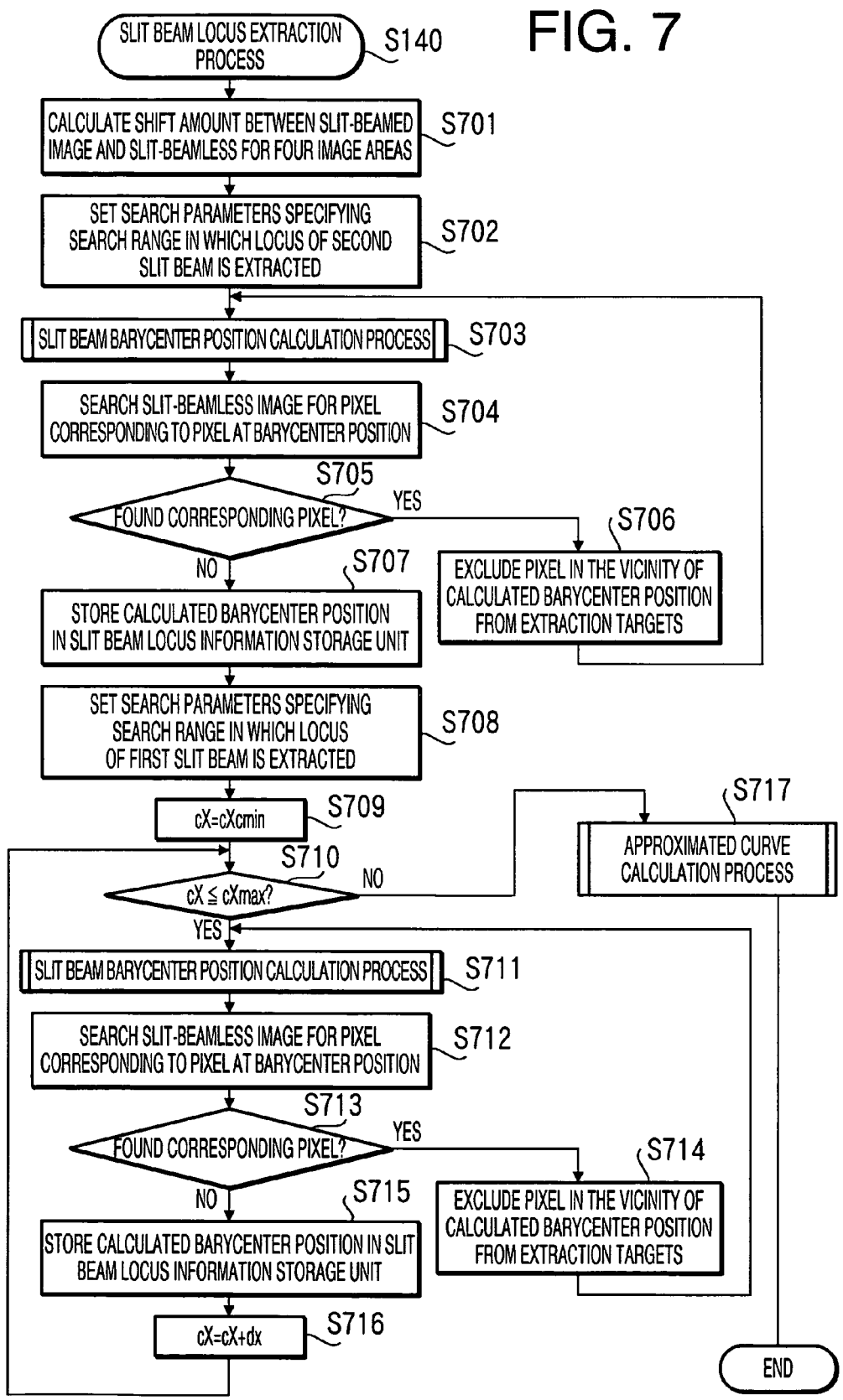

FIG. 7 is a flow chart showing the slit beam locus extraction process.

Figure 8:
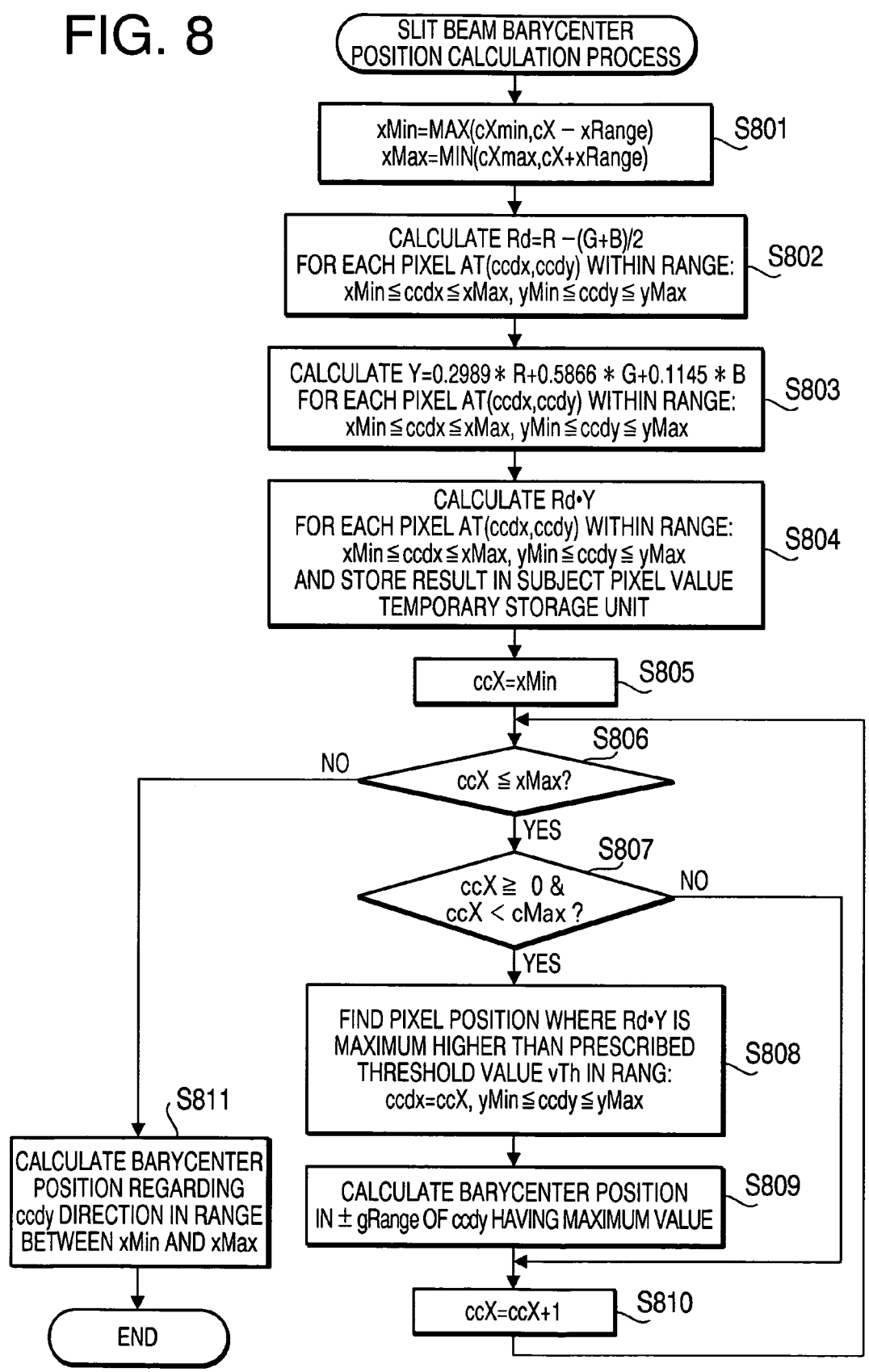

FIG. 8 is a flow chart showing a slit beam barycenter position calculation process.

Figure 9:
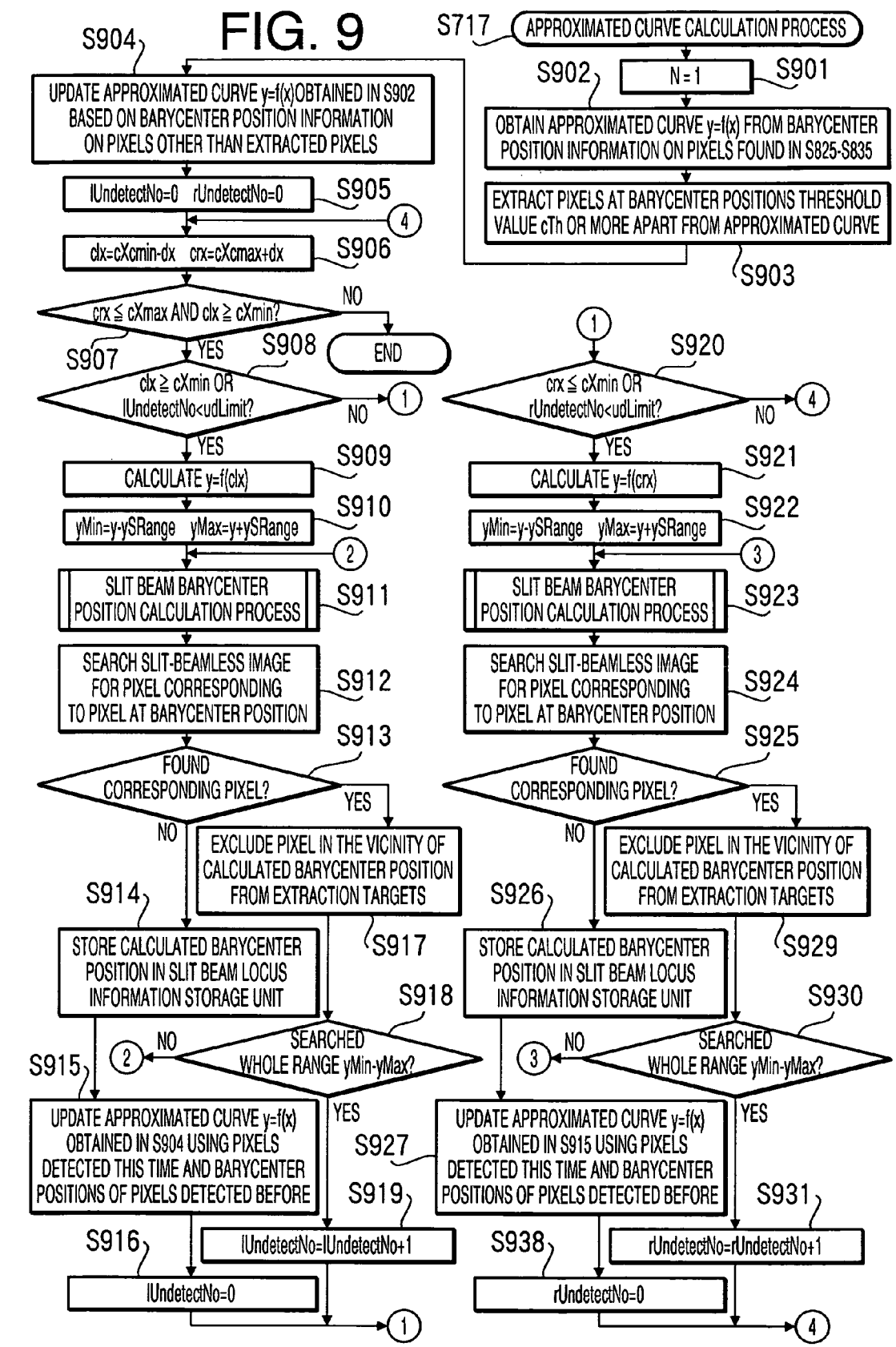

FIG. 9 is a flow chart showing an approximated curve calculation process.

Figure 10:
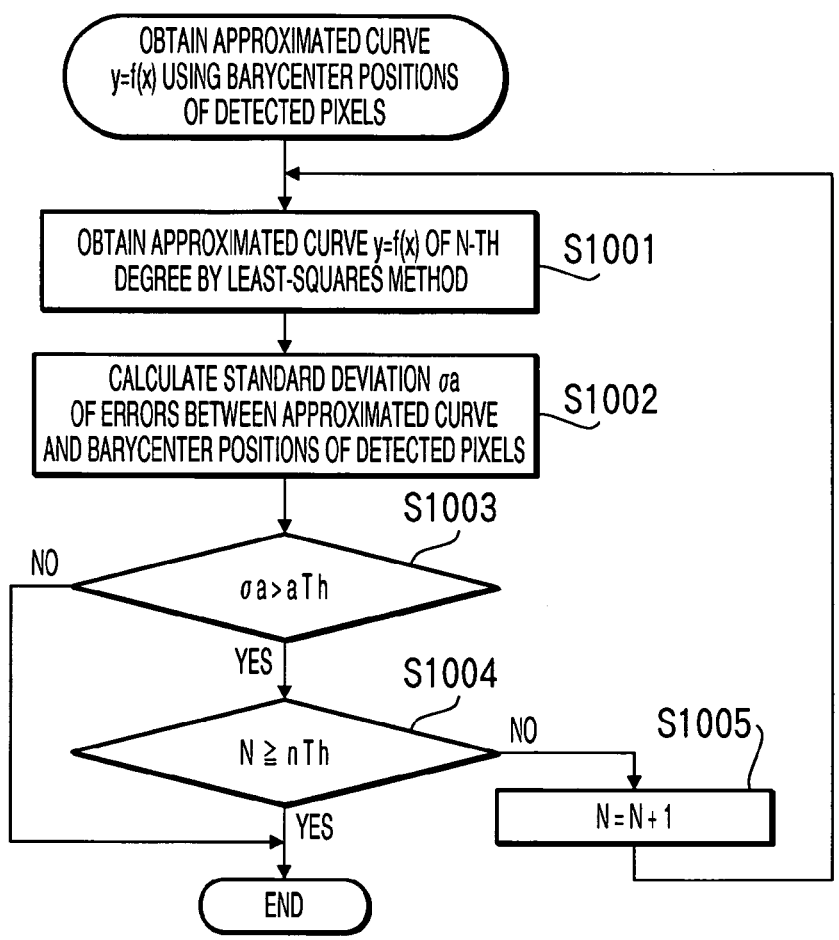

FIG. 10 is a flow chart showing a process for updating an approximated curve.

Figure 11:
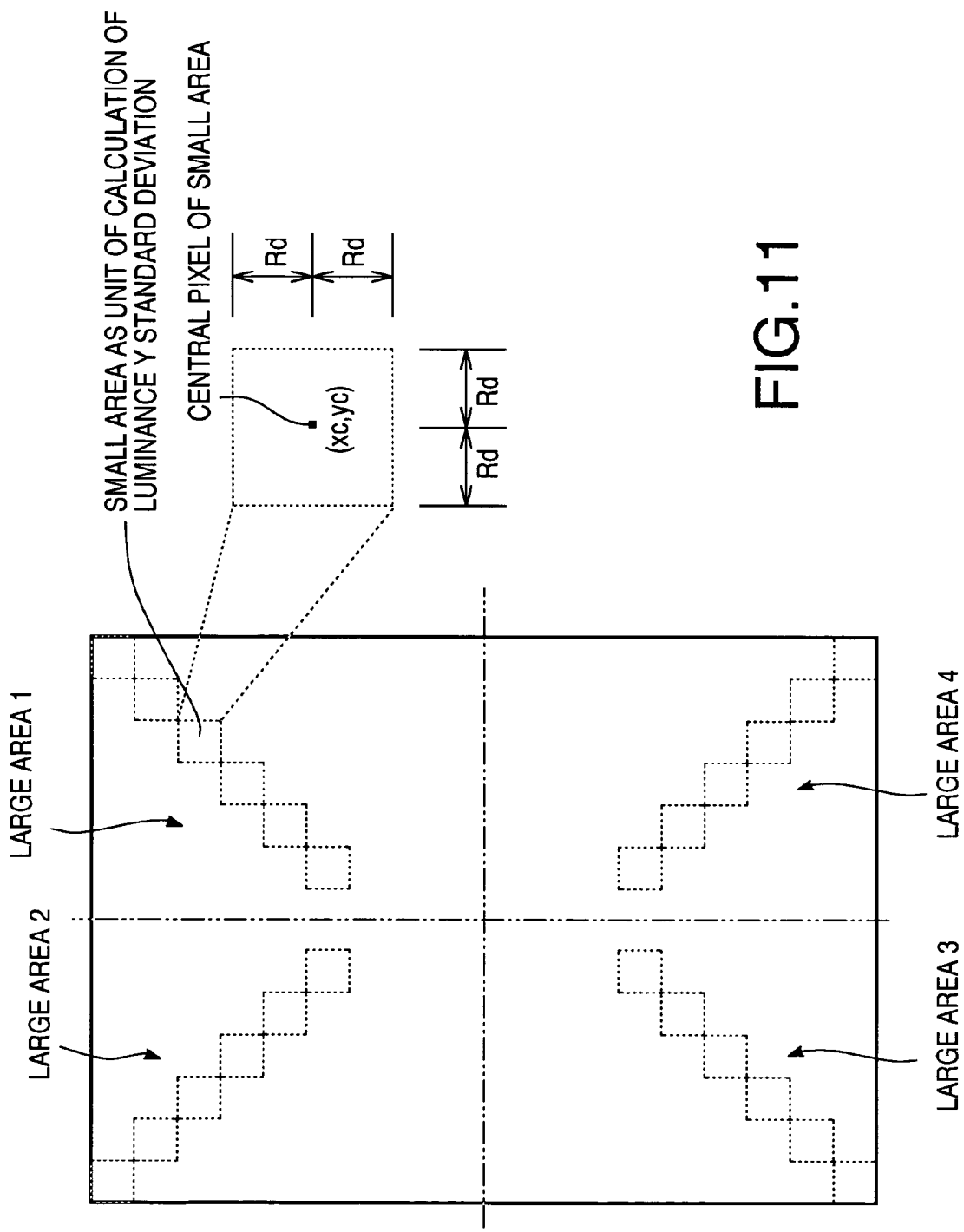

FIG. 11 is a schematic diagram for explaining a method for setting a search range which is used for searching for a corresponding pixel in a slit-beamless image.

FIG. 12(a) shows a captured image of a document P onto which the slit beams are projected.

FIG. 12(b) is an enlarged view schematically showing pixels around a slit beam detecting position cX.

Figure 13:
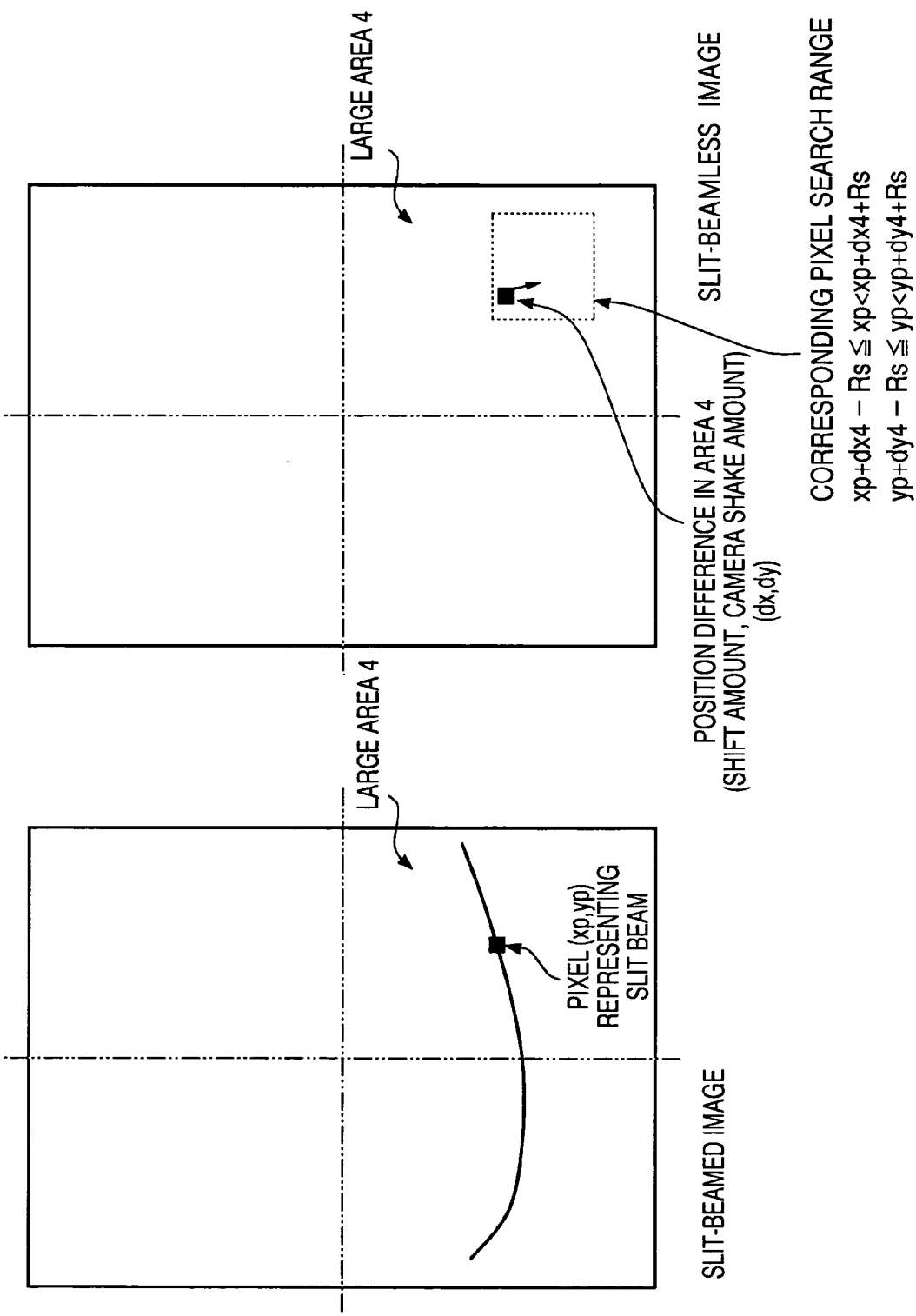

FIG. 13 is a schematic diagram for explaining a method for setting the search range in the slit-beamless image taking a camera shake amount into consideration.

Figure 14:
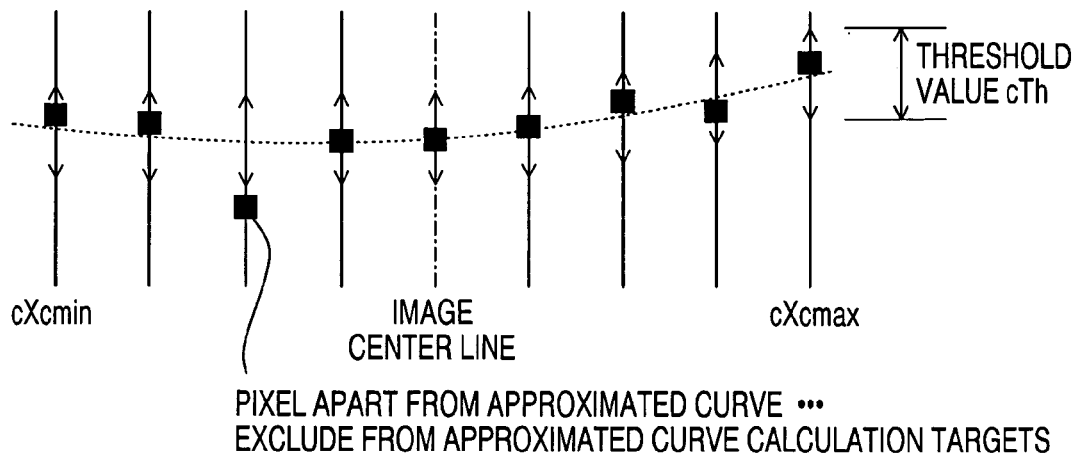

FIG. 14 is an enlarged view schematically showing a part A in FIG. 12(a).

Figure 15:
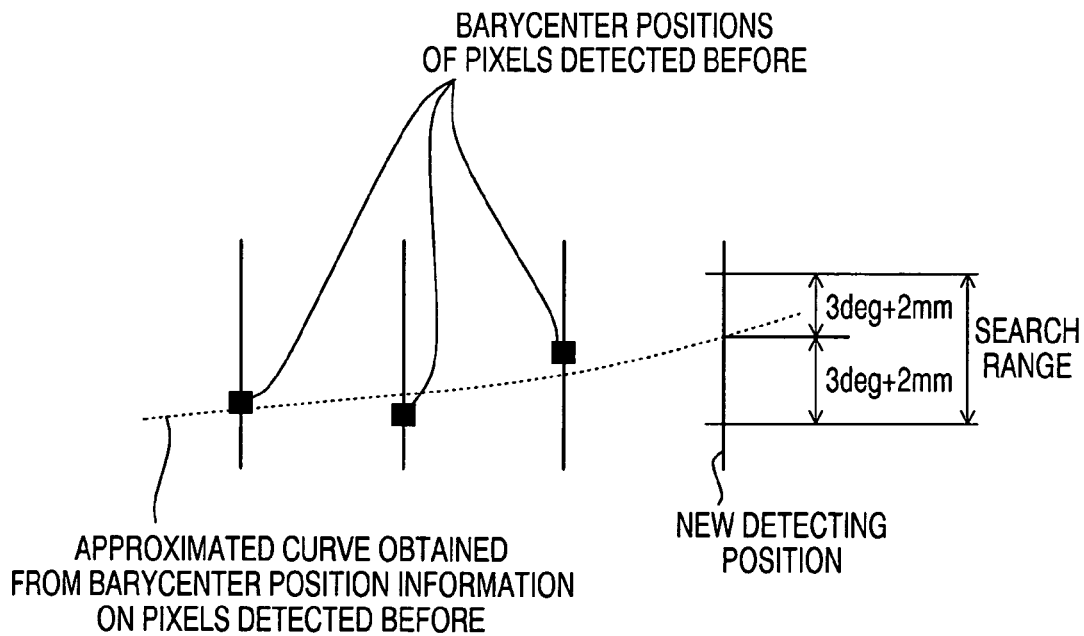

FIG. 15 is an enlarged view schematically showing a part B in FIG. 12(a).

Figure 16:
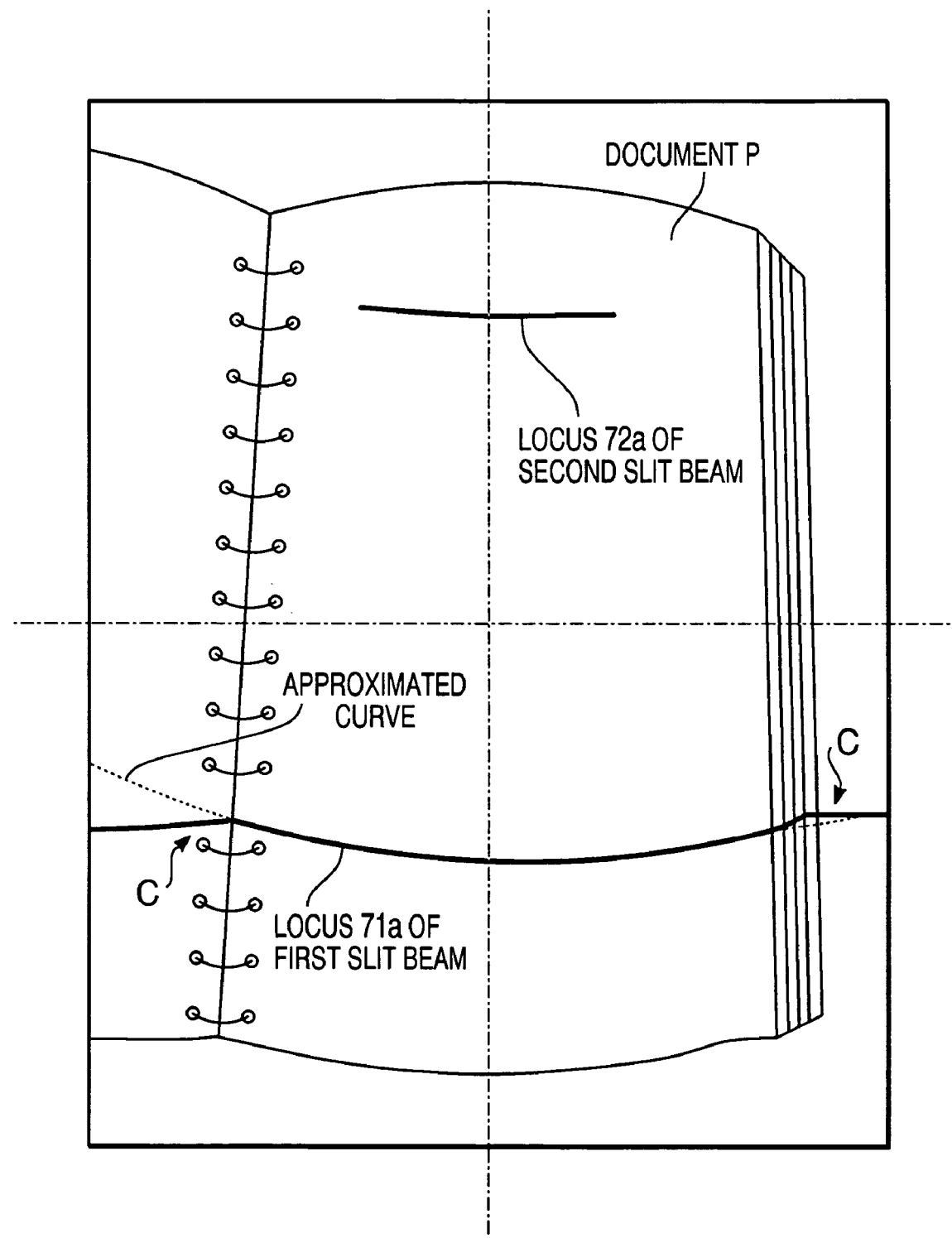

FIG. 16 is a schematic diagram showing a captured image of a filed document.

FIGS. 17(a) and 17(b) are schematic diagrams showing a slit-beamed image.

FIGS. 18(a) and 18(b) are schematic diagrams for explaining a method for calculating three-dimensional spatial positions.

FIGS. 19(a)-19(c) are schematic diagrams for explaining a coordinate system which is used in document attitude calculation.

Figure 20:
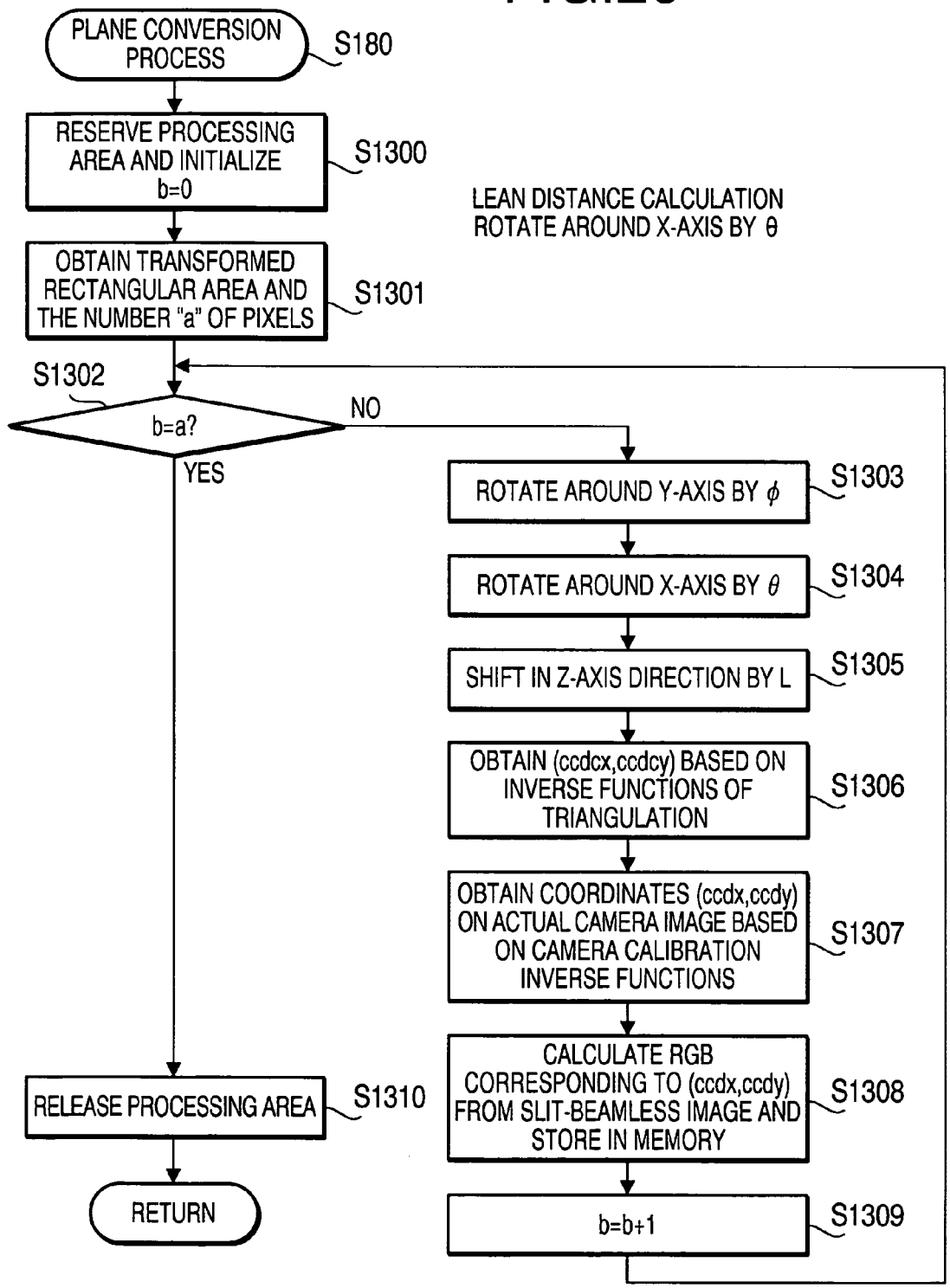

FIG. 20 is a flow chart showing a plane conversion process.

DESCRIPTION OF REFERENCE CHARACTERS 1 image capturing device (including a three-dimensional shape detecting device)
20 slit beam projection unit (pattern light projection means)
32 CCD image sensor (image capturing means)
421 camera control program (image capturing means)
422 slit beam locus extraction program
423 triangulation calculation program
424 document attitude calculation program (three-dimensional shape calculation means)
425 plane conversion program (plane image correction means)
429 approximated curve calculation program (approximated curve calculation means)

DETAILED DESCRIPTION OF THE EMBODIMENTS

Referring now to the drawings, a description will be given in detail of a preferred embodiment in accordance with the present invention. FIG. 1(a) is an external perspective view of an image capturing device 1 in accordance with the present invention. FIG. 1(b) is a schematic sectional view of the image capturing device 1. Incidentally, a three-dimensional shape detecting device as an embodiment of the present invention is a device contained in the image capturing device 1. A three-dimensional shape detecting program as an embodiment of the present invention is a program executed by the image capturing device 1 under the control of a CPU 41 (see FIG. 4).

The image capturing device 1 includes a body case 10 in a box shape, an imaging lens 31 provided at the front of the body case 10, and a CCD image sensor 32 placed at the rear of the imaging lens 31 (inside the image capturing device 1). The image capturing device 1 further includes a slit beam projection unit 20 placed underneath the imaging lens 31, a processor 40 installed in the body case 10, a release button 52 and a mode selection switch 59 placed on top of the body case 10, and a memory card 55 inserted in the body case 10. The above components are connected together by signal lines as shown in FIG. 4.

The image capturing device 1 is further equipped with an LCD (Liquid Crystal Display) 51 provided on the back of the body case 10 and a finder 53 provided to penetrate the body case 10 from its back to front, which are used when the user decides an imaging range to be captured by the image capturing device 1.

The imaging lens 31 is formed by a plurality of lenses. The image capturing device 1 has the autofocus function and automatically adjusts the focal length and aperture, by which the imaging lens 31 is driven so as to focus light from the outside on the CCD image sensor 32.

The CCD image sensor 32 includes photoelectric transducers such as CCDs (Charge Coupled Devices) which are arranged like a matrix. The CCD image sensor 32 generates signals corresponding to colors and intensities of light of the image forming on its surface, converts the signals into digital data, and outputs the digital data to the processor 40. Incidentally, data outputted by one CCD is pixel data of one pixel forming the image. A piece of image data includes the same number of pixel data as the CCDs.

The release button 52 is made of a push button switch. The pressing of the release button 52 by the user is detected by the processor 40 which is connected with the release button 52. The mode selection switch 59 is implemented by a slide switch that is switchable between two positions, for example. The two switch positions of the mode selection switch 59 have been assigned to the processor 40 so that one will be recognized as a "normal mode" and the other as a "corrective imaging mode". The "normal mode" is a mode in which image data is generated directly from an image of the document P captured by the image capturing device 1. The "corrective imaging mode" is a mode in which the image data is corrected into image data representing the document P shot from the front when the document P is shot from an oblique direction.

The memory card 55, implemented by a nonvolatile rewritable memory, is attachable and detachable to/from the body case 10.

The LCD 51 includes a liquid crystal display for displaying images. The LCD 51 displays images in response to image signals supplied from the processor 40. The processor 40 sends a variety of image signals to the LCD 51 depending on the situation, such as image signals for displaying real-time images captured by the CCD image sensor 32, image signals for displaying images stored in the memory card 55, image signals for displaying characters indicating the settings of the device, etc.

The finder 53, including an optical lens, is formed so that the user looking into the finder 53 from the rear of the image capturing device 1 can view a range substantially equal to the range of the image formed by the imaging lens 31 on the CCD image sensor 32.

Figure 2:
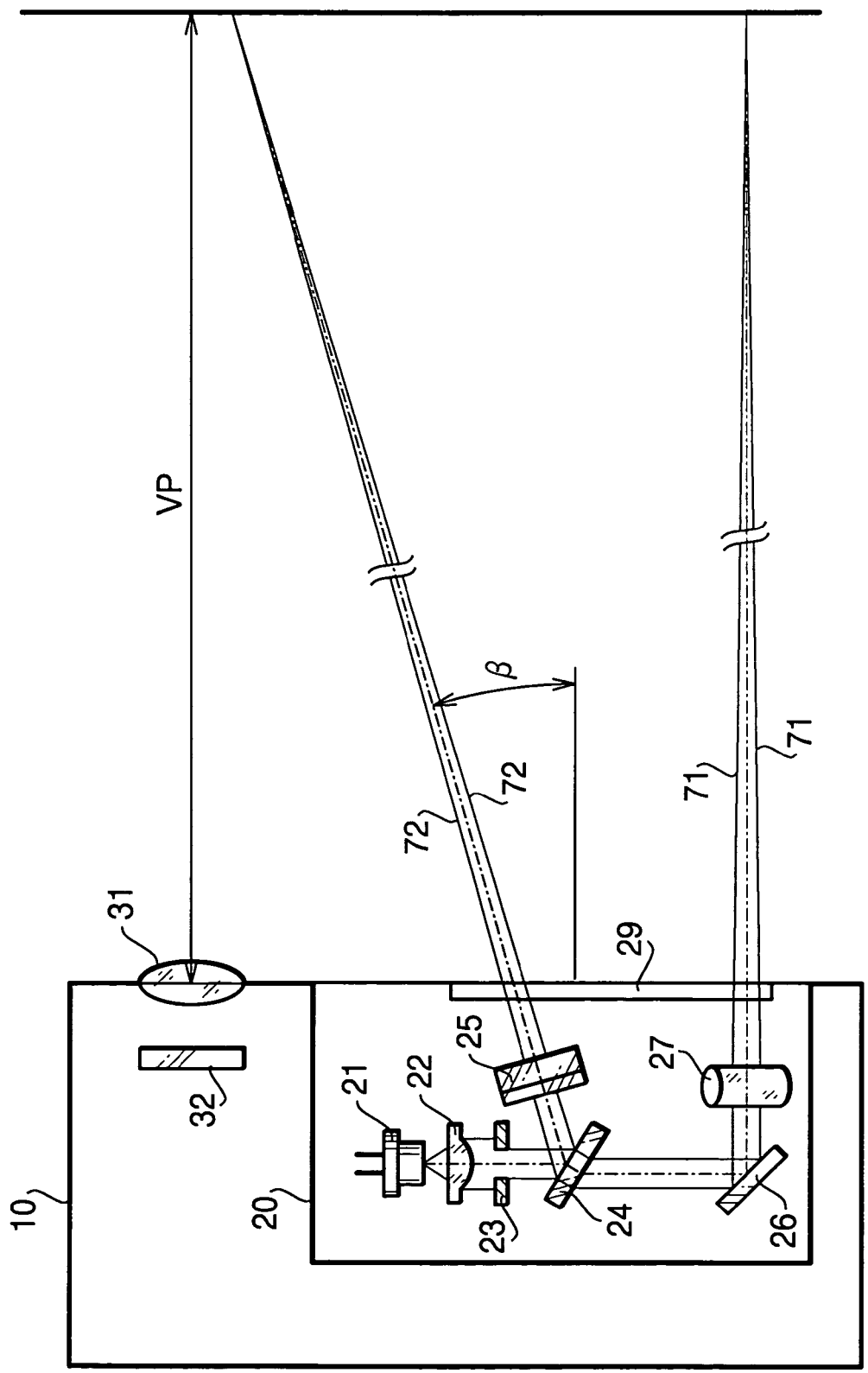
FIG. 2 is a schematic diagram showing the composition of a slit beam projection unit.
Figure 3:
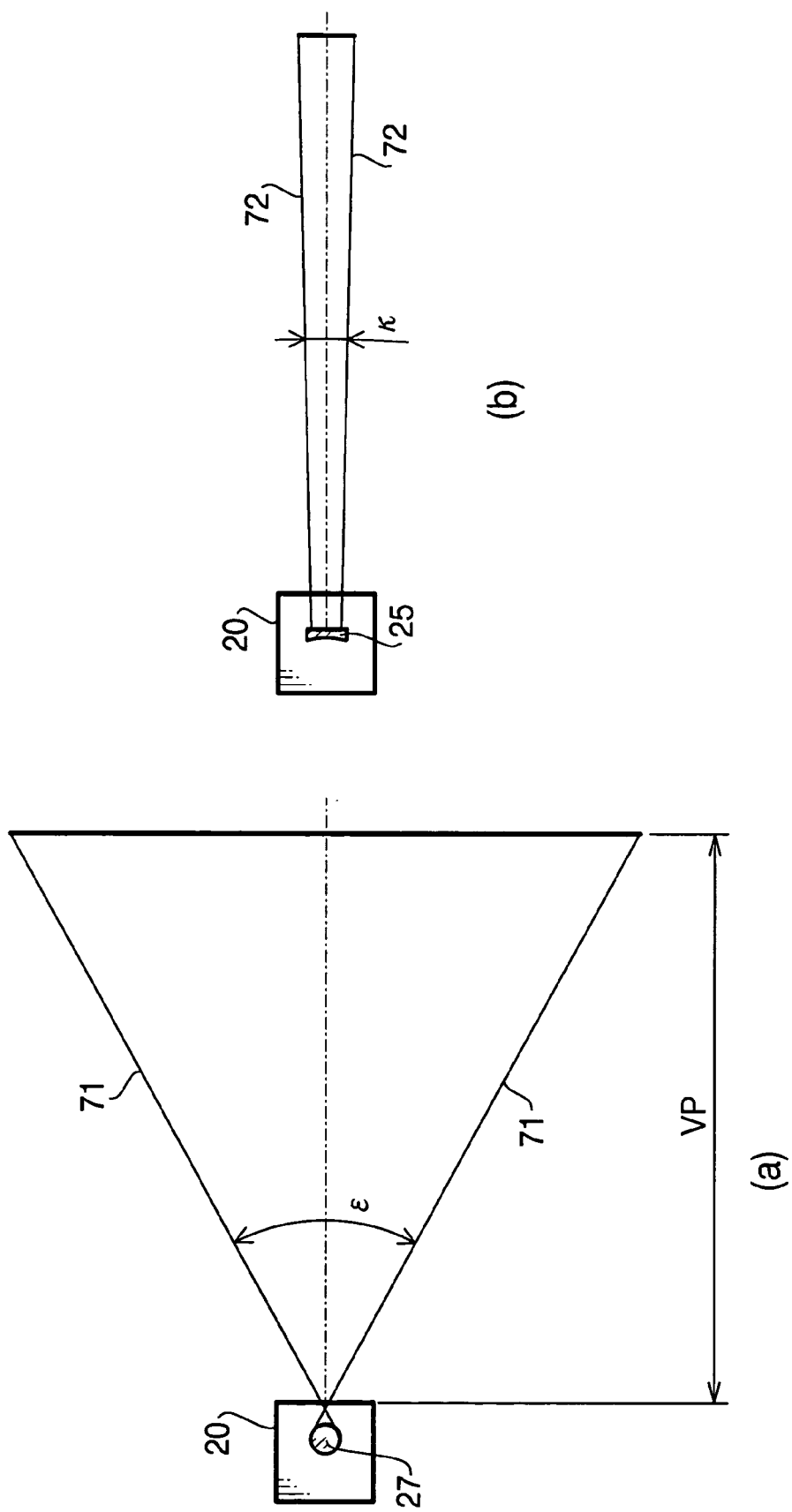

Next, the slit beam projection unit 20 will be explained referring to FIGS. 2 and 3. FIG. 2 is a schematic diagram showing the composition of the slit beam projection unit 20. FIG. 3 is a schematic diagram for explaining angular widths of slit beams. The slit beam projection unit 20 includes a laser diode 21, a collimator lens 22, an aperture 23, a transparent flat plate 24, a cylindrical lens 25, a reflecting mirror 26 and a rod lens 27.

The laser diode 21 emits a red laser beam. The ON-OFF switching of the laser beam emission by the laser diode 21 is controlled according to instructions outputted by the processor 40. The output level (rated power) of the laser diode 21 is adjusted so that a prescribed output level (e.g. 1 mW) can be achieved at a position just after the aperture 23 relative to the maximum rated power (e.g. 5 mW), in consideration of individual differences in the spread angle of the laser beam.

The collimator lens 22 condenses the laser beam emitted by the laser diode 21 so that the beam will focus at a point a reference distance VP (e.g. 330 mm) away from the slit beam projection unit 20.

The aperture 23, formed by a plate having a rectangular opening part, shapes the laser beam from the collimator lens 22 into a rectangular shape by letting part of the laser beam through the opening part.

The transparent flat plate 24 is composed of a transparent flat plate made of pure glass material, for example. The back of the transparent flat plate 24 is provided with an AR coat (antireflection coating). The transparent flat plate 24 is tilted toward the front of the body case 10 by a prescribed angle β (e.g. 33 degrees) with respect to a plane orthogonal to the optical axis of the laser beam from the aperture 23. The transparent flat plate 24 reflects approximately 5% (approximately 50 µW) of the power of the laser beam from the aperture 23 by its surface while transmitting approximately 95% (approximately 950 µW). Incidentally, the direction into which the laser beam is reflected by the transparent flat plate 24 (frontward from the image capturing device 1 and 33 degrees upward relative to the horizontal plane) will be referred to as a "second direction".

Thanks to the AR coat provided on the back of the transparent flat plate 24, reflection occurring when the laser beam entering the transparent flat plate 24 emerges therefrom is suppressed, by which loss of the laser beam inside the transparent flat plate 24 is reduced. Further, by setting the ratio of the laser beam reflected by the transparent flat plate 24 at a surface reflectance 5% which is determined by the refractive index of the material of the transparent flat plate 24, a process for forming a vapor-deposited metal film on the reflecting surface (necessary when the component is implemented by an ordinary half mirror) can be left out.

The reflecting mirror 26 includes a member (mirror, etc.) totally reflecting the laser beam. The reflecting mirror 26 is placed on the downstream side of the transparent flat plate 24 transmitting the laser beam, while being tilted toward the front of the body case 10 by 45 degrees. The reflecting mirror 26 totally reflects the laser beam and changes its optical path direction by 90 degrees. The direction into which the laser beam is reflected by the reflecting mirror 26 (frontward from the image capturing device 1 and at 0 degrees relative to the horizontal plane) will be referred to as a "first direction".

The rod lens 27, formed by a lens of a cylindrical shape having a short positive focal length, is placed on the downstream side of the reflecting mirror 26 reflecting the laser beam so that the axis of the cylindrical shape will be in the vertical direction. Since the focal length of the rod lens 27 is short, the laser beam from the reflecting mirror 26 entering the rod lens 27 immediately spreads from a focal point as shown in FIG. 3(a), and is outputted in the first direction as a slit beam having a prescribed spread angle ε (e.g. 48 degrees). Incidentally, the slit beam emerging from the rod lens 27 will hereinafter be referred to as a "first slit beam 71".

The rod lens 27 is formed by a lens of a cylindrical shape having a short positive focal length. The rod lens 27 is placed on the downstream side of the reflecting mirror 26 reflecting the laser beam so that the axis of the cylindrical shape will be in the vertical direction. The focal length of the rod lens 27 is short. Therefore, as shown in FIG. 3(a), the laser beam passing through the rod lens 27 immediately starts spreading from a focal point in the vicinity of the rod lens 27 and is outputted in the first direction as a slit beam having a prescribed spread angle ε (e.g. 48 degrees). The slit beam emerging from the rod lens 27 will hereinafter be referred to as a "first slit beam 71".

The cylindrical lens 25 is a lens having a concave shape on one side to have a negative focal length. The cylindrical lens 25 is placed on the downstream side of the transparent flat plate 24 reflecting the laser beam so that its lens surface will be orthogonal to the second direction. As shown in FIG. 3(b), the cylindrical lens 25 receives the laser beam incident from the transparent flat plate 24 and outputs the laser beam as a slit beam spreading at a spread angle κ. The slit beam emerging from the cylindrical lens 25 will hereinafter be referred to as a "second slit beam 72". The spread angle κ by the cylindrical lens 25 is set so that the ratio between the spread angle ε of the first slit beam 71 and the spread angle κ of the second slit beam 72 will be substantially equal to the power ratio between the laser beams split by the transparent flat plate 24. Therefore, the spread angle κ of the second slit beam 72 is 5% of the spread angle ε of the first slit beam (κ=2.4 degrees).

With the above components, the slit beam projection unit 20 lets the laser diode 21 emit the laser beam according to the instructions from the processor 40 and thereby outputs the first and second slit beams 71 and 72 in the first and second directions respectively through a window 29 of the body case 10 formed under the imaging lens 31. Incidentally, since a red laser beam is emitted from the laser diode 21, each of the first and second slit beams 71 and 72 (generated from the red laser beam) is mainly composed of the red value R (as a spectroscopic component, out of the R, G and B values in the RGB space).

With the slit beam projection unit 20 configured as above, the power of the second slit beam 72 relative to the total power outputted by the laser diode 21 is as small as approximately 5% while the power of the first slit beam 71 split by the transparent flat plate 24 is 95%. However, the power of the first slit beam 71 (spread angle: 48 degrees) per unit angular width (approximately 20 µW/degree) is substantially equal to that (approximately 21 µW/degree) of the second slit beam 72 (spread angle: 2.4 degrees). When a document P is white paper that is placed the reference distance VP (330 mm) away from the slit beam projection unit 20, the illumination intensity achieved by the first and second slit beams 71 and 72 is approximately 1260 lux, by which a sufficient difference in luminance can be secured between the document P and loci of the slit beams even in places where the illumination intensity is 500-1000 lux (average room illumination). Therefore, a locus image of the slit beams can be extracted reliably by a slit beam locus extraction program 422 which will be explained later.

FIG. 4 is a block diagram showing the electrical configuration of the image capturing device 1. The processor 40 installed in the image capturing device 1 includes a CPU 41, a ROM 42 and a RAM 43.

The CPU 41 executes various processes such as the detection of the pressing of the release button 52, the reading of image data from the CCD image sensor 32, the writing of image data into the memory card 55, the detection of the status of the mode selection switch 59, and the switching of the slit beam emission from the slit beam projection unit 20, according to processes specified by programs stored in the ROM 42 while using the RAM 43.

The ROM 42 stores a camera control program 421, a slit beam locus extraction program 422, a triangulation calculation program 423, a document attitude calculation program 424, a plane conversion program 425, a luminance variance calculation program 426, a cross-correlation coefficient calculation program 427, a corresponding pixel searching program 428 and an approximated curve calculation program 429.

The camera control program 421 is a program for the overall control of the image capturing device 1, including a process shown in a flow chart of FIG. 5 (details will be explained later). The slit beam locus extraction program 422 is a program for extracting loci of the slit beams from an image of the document P onto which the slit beams are projected. The triangulation calculation program 423 is a program for calculating a three-dimensional spatial position for each pixel of the loci of the slit beams extracted by the slit beam locus extraction program 422.

The document attitude calculation program 424 is a program for estimating the three-dimensional shape of the document P based on the three-dimensional spatial positions of loci 71a and 72a of the first and second slit beams. The plane conversion program 425 is a program which receives information on the position and attitude of the document P and thereby converts image data stored in a slit-beamless image storage unit 432 into an image of the document P shot from the front. The luminance variance calculation program 426 is a program for calculating the standard deviation regarding color values in each small area in the slit-beamless image.

The cross-correlation coefficient calculation program 427 is a program for calculating a shift amount between the slit-beamed image and the slit-beamless image. The corresponding pixel searching program 428 is a program for searching the slit-beamless image for determining whether each pixel detected from the slit-beamed image exists in the slit-beamless image or not. The approximated curve calculation program 429 is a program for calculating an approximated curve of the locus 71a of the first slit beam based on pixels forming part of the locus 71a of the first slit beam.

In the RAM 43, storage areas such as a slit-beamed image storage unit 431, the slit-beamless image storage unit 432, a subject pixel value temporary storage unit 433, a triangulation calculation result storage unit 434, a document attitude calculation result storage unit 435, a slit beam locus information storage unit 436, a camera shake amount storage unit 437 an approximated curve storage unit 438 and a working area 439 are reserved.

In the slit-beamed image storage unit 431 and the slit-beamless image storage unit 432, image data of the slit-beamed image and the slit-beamless image supplied from the CCD image sensor 32 are stored, respectively. In the subject pixel value temporary storage unit 433, an "Rd·Y value" which is obtained by multiplying a red difference value Rd (obtained by subtracting the average of a green value G and a blue value B from a red value R) by a luminance value Y is stored regarding each pixel contained in a search range in the slit-beamed image. In the triangulation calculation result storage unit 434, the calculation result of the position of each point in the slit-beamed image is stored.

In the document attitude calculation result storage unit 435, the calculation result of the position and attitude of the document P is stored. In the slit beam locus information storage unit 436, a barycenter position which is calculated in a slit beam barycenter position calculation process (explained later) is stored. In the camera shake amount storage unit 437, the shift amount between the slit-beamed image and the slit-beamless image calculated by the cross-correlation coefficient calculation program 427 is stored. In the approximated curve storage unit 438, the approximated curve calculated by the approximated curve calculation program 429 is stored. In the working area 439, data necessary for the calculations by the CPU 41 are stored temporarily.

In the following, the operation of the above image capturing device 1 after the release button 52 is pressed by the user will be explained referring to FIG. 5. FIG. 5 is a flow chart showing a process executed by the processor 40 of the image capturing device 1. Incidentally, the details of a slit beam locus extraction process (S140), a triangulation calculation process (S160), a document attitude calculation process (S170) and a plane conversion process (S180) will be described later.

When the release button 52 is pressed by the user, the switch position of the mode selection switch 59 is detected and whether the switch is at the position of the "corrective imaging mode" or not is judged (S110). If the mode selection switch 59 is at the position of the "corrective imaging mode" (S110: YES), an instruction for the emission by the laser diode 21 is issued to the slit beam projection unit 20 and with the first and second slit beams 71 and 72 emitted from the slit beam projection unit 20, image data represented by RGB values is obtained from the CCD image sensor 32 as the slit-beamed image (S120). Further, the image data read out from the CCD image sensor 32 is stored in the slit-beamed image storage unit 431 of the RAM 43 in the step S120.

After the reading of the image data of the slit-beamed image (S120), the process advances to step S130. In the step S130, an instruction for stopping the emission by the laser diode 21 is issued to the slit beam projection unit 20 and after the emission of the first and second slit beams 71 and 72 is stopped, image data represented by RGB values is read out from the CCD image sensor 32 as a slit-beamless image. Further, the image data read out is stored in the slit-beamless image storage unit 432 in the step S130.

After the reading of the image data of the slit-beamless image (S130), the process advances to step S140 and the slit beam locus extraction process is executed. In the step S140, pixels forming the loci 71a and 72a of the first and second slit beams are detected by the slit beam locus extraction program 422 from the image data of the slit-beamed image loaded in the slit-beamed image storage unit 431, and data regarding the pixels are stored in the subject pixel value temporary storage unit 433.

After the slit beam locus extraction process (S140) is finished, an aberration correction process (S150) is executed. By the aberration correction process, image distortion that is dependent on the angle from the optical axis is corrected.

After the aberration correction process (S150) is finished, the triangulation calculation process (S160) is executed. In the triangulation calculation process (S160), a three-dimensional spatial position is calculated by the triangulation calculation program 423 for each of the pixels forming the loci 71a and 72a of the first and second slit beams stored in the subject pixel value temporary storage unit 433. The calculation result for each pixel is stored in the triangulation calculation result storage unit 434.

After the triangulation calculation process (S160) is finished, the document attitude calculation process (S170) is executed. In the document attitude calculation process (S170), the position and attitude of the document P are calculated by the document attitude calculation program 424 by use of the three-dimensional spatial positions of the loci of the first and second slit beams stored in the triangulation calculation result storage unit 434. The result of the calculation is stored in the document attitude calculation result storage unit 435.

After the document attitude calculation process (S170) is finished, the plane conversion process (S180) is executed. In the plane conversion process (S180), the image data stored in the slit-beamless image storage unit 432 is converted by the plane conversion program 425 into image data of an image observing the document P from the front based on the position and attitude of the document P.

After the plane conversion process (S180) is finished, the image data of the erect image generated by the plane conversion process is written into the memory card 55 (S190) and the process of FIG. 5 is ended.

In the aforementioned step S110, if the mode selection switch 59 is not at the "corrective imaging mode" but at the "normal mode" (S110: NO), a slit-beamless image is read out from the CCD image sensor 32 with no laser beam emitted from the laser diode 21 and no first and second slit beams 71 and 72 outputted by the slit beam projection unit 20 (S200). Subsequently, the obtained image data is written into the memory card 55 (S210). After the step S210, the process of FIG. 5 is ended.

Next, the aforementioned slit beam locus extraction process (S140) will be explained specifically referring to FIGS. 6 through 16.

Figure 6:
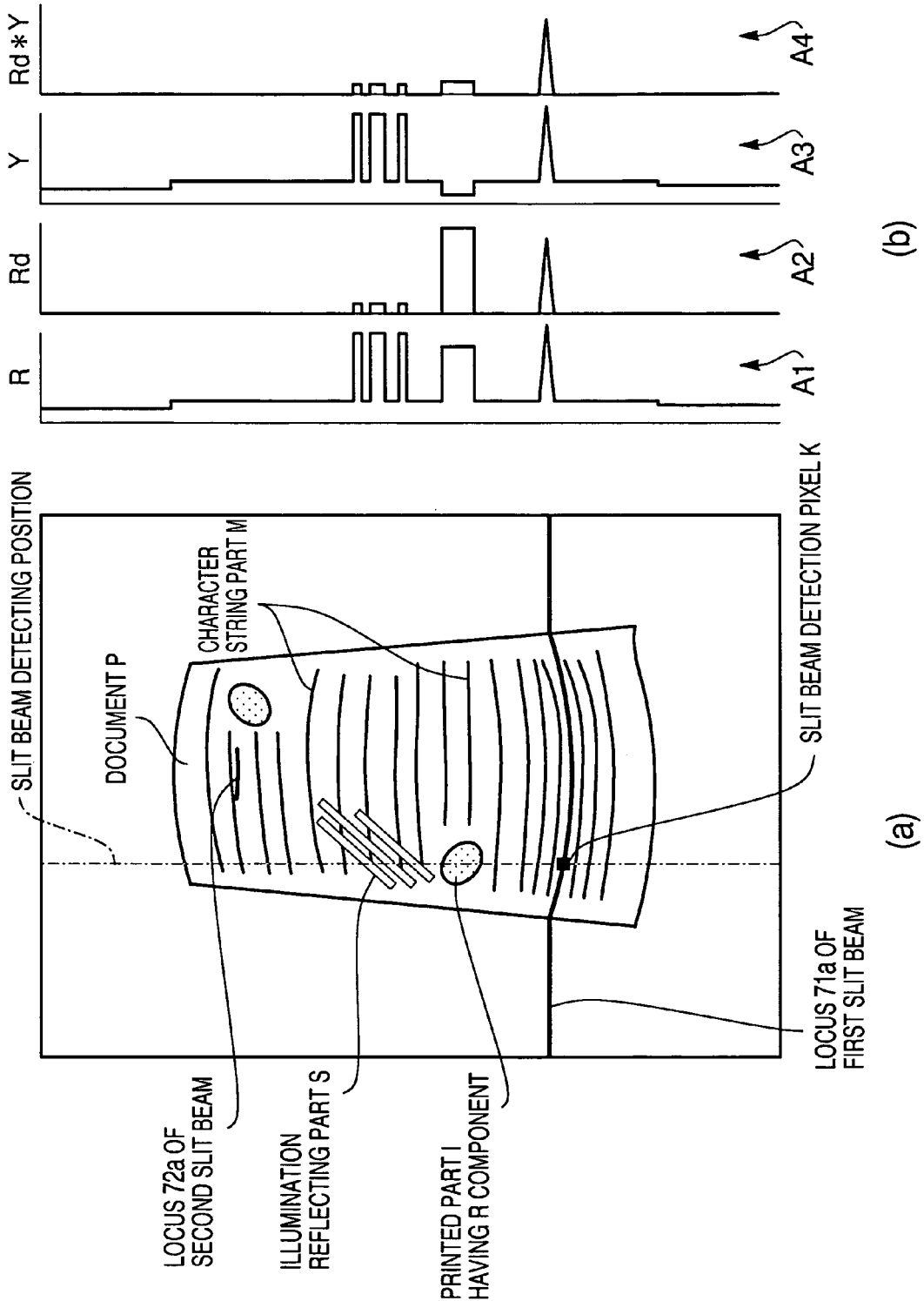

First, an extraction principle, employed for extracting pixels representing the slit beams from the slit-beamed image with high accuracy by clarifying the difference between the pixels forming the loci of the slit beams (the pixels representing the slit beams) and pixels not representing the slit beams in the slit-beamed image, will be explained referring to FIG. 6.

FIG. 6(a) shows a captured image of the document P onto which the slit beams are projected. Formed on the document P are: a plurality of character string parts M extending in the width direction of the document, illumination reflecting parts S shown in rectangular shapes, printed parts 1 surrounded by circles as parts having the red (R) component as the main color component, and the loci 71a and 71b of the first and second slit beams extending in the width direction of the document P. The chain line extending in a direction orthogonal to the width direction of the document P represents a slit beam detecting position. The point of intersection of the slit beam detecting position (chain line) and the locus 71a of the first slit beam is defined as a slit beam detection pixel K.

FIG. 6(b) shows graphs indicating the values of prescribed parameters at the slit beam detecting position (the chain line in FIG. 6(a)), in which a part of each graph intersecting with a line drawn directly from the "slit beam detecting position" (from the chain line) indicates the value of each prescribed parameter at the "slit beam detecting position". In other words, a position on the vertical axis of each graph in FIG. 6(b) corresponds to a position on the vertical axis of FIG. 6(a). In the graphs A1, A2, A3 and A4, the red value R, the red difference value Rd, the luminance value Y and the product value Rd·Y (of the red difference value Rd and the luminance value Y) are employed as the prescribed parameters, respectively.

The red difference value Rd is obtained by subtracting the average of the green value G and the blue value B from the red value R. Therefore, the red difference value Rd is capable of emphasizing the red value R (corresponding to the R component as the main component of the slit beams) at the slit beam detecting position more than the other components (G value, B value). A pixel having a red value R close to its green value G and blue value B has a low red difference value Rd, while a pixel having a red value R higher than its green value G and blue value B has a high red difference value Rd.

The luminance value Y, representing the luminance of each pixel at the slit beam detecting position, is the Y value in the YCbCr space. The conversion from the RGB space into the YCbCr space can be made by the following expressions:

$Y=0.2989*R+0.5866*G+0.1145*B$ $Cb=-0.1687*R-0.3312*G+0.5000*B$ $Cr=0.5000*R-0.4183*G-0.0816*B$

The graph A1 shows that the red value R is high at the slit beam detection pixel K, in the printed part I having the R component, and in the illumination reflecting parts S. Trying to detect the slit beam detection pixel K based on the red value R can result in failure. For example, in cases where the slit beam detection pixel K is contained in a printed part I having the R component or in an illumination reflecting part S, there is no distinct difference in the red value R between the slit beam detection pixel K and the other, and thus it is impossible to precisely detect or distinguish the slit beam detection pixel K from the printed part I having the R component or the illumination reflecting part S.

The graph A2 shows that the illumination reflecting parts S have lower red difference values Rd compared to the slit beam detection pixel K and the printed part I having the R component. Therefore, even when the slit beam detection pixel K is contained in an illumination reflecting part S, the slit beam detection pixel K can be precisely detected and distinguished from the illumination reflecting part S based on the red difference value Rd since there is a distinct difference in the red difference value Rd between the two. However, when the slit beam detection pixel K is contained in a printed part I having the R component, it is impossible to precisely detect or distinguish the slit beam detection pixel K from the printed part I having the R component based on the red difference value Rd since there is no distinct difference in the red difference value Rd between the two.

The graph A3 shows that the printed part I having the R component has a lower luminance value Y compared to the slit beam detection pixel K and the illumination reflecting parts S. Therefore, even when the slit beam detection pixel K is contained in a printed part I having the R component, the slit beam detection pixel K can be precisely detected and distinguished from the printed part I having the R component based on the luminance value Y since there is a distinct difference in the luminance value Y between the two. However, when the slit beam detection pixel is contained in an illumination reflecting part S, it is impossible to precisely detect or distinguish the slit beam detection pixel K from the illumination reflecting part S based on the luminance value Y since there is no distinct difference in the luminance value Y between the two.

Therefore, focusing on the fact that the slit beam detection pixel K has higher red difference value Rd and luminance value Y compared to illumination reflecting parts S and printed parts I having the R component as shown in the graphs A2 and A3, pixels representing the slit beams are detected in this process based on the product value Rd·Y of the red difference value Rd and the luminance value Y (hereinafter referred to as an "Rd·Y value").

As shown in the graph A4, the slit beam detection pixel K has a higher Rd·Y value compared to the illumination reflecting parts S and the printed part I having the R component. Therefore, even when the slit beam detection pixel K is contained in an illumination reflecting parts S or a printed part I having the R component, the slit beam detection pixel K can be precisely detected and distinguished from the illumination reflecting parts S or the printed part I based on the Rd·Y value since there is a distinct difference in the Rd·Y value between the slit beam detection pixel K and the other.

Next, a concrete procedure of the slit beam locus extraction process (S140 in FIG. 5) will be explained below referring to flow charts of FIGS. 7-10. FIG. 7 is a flow chart of the slit beam locus extraction process.

At the start of the slit beam locus extraction process, the shift amount between the slit-beamed image and the slit-beamless image is calculated (S701).

The shift amount between the slit-beamed image and the slit-beamless image is caused by the "camera shake" by the user, etc. during the interval between the two images which are not shot at the same time. The shift amount between the two images can be obtained by letting the cross-correlation coefficient calculation program 427 calculate a cross-correlation coefficient "cc" between two pixels. Incidentally, the cross-correlation coefficient cc can take on values between −1 and 1, and a position giving the maximum value represents the shift amount.

It is desirable that the calculation of the cross-correlation coefficient cc be made in characteristic parts of the images since no clear difference in the cross-correlation coefficient cc is obtained by calculating the cross-correlation coefficient cc in solid white parts, solid black parts, parts in a particular solid color, etc. Therefore, a search process, for searching for a characteristic part in the slit-beamless image, is executed before the calculation of the cross-correlation coefficient cc.

In the search process, the slit-beamless image is partitioned into four large areas 1-4 as shown in FIG. 11. Each large area 1-4 is further partitioned into small areas arranged from a corner of the large area (upper right in the area 1, upper left in the area 2, lower left in the area 3, lower right in the area 4) toward the center of the slit-beamless image, and the standard deviation of the luminance Y is obtained in each small area. The standard deviation σY of the luminance Y is calculated by the luminance variance calculation program 426 according to the following two expressions #1 and #2.

In the expression #1, (xc, yc) represents a pixel at the center of the small area and "Rd" represents half the size of the small area. Specifically, when the image size is approximately 1200 pixels×1600 pixels, the size of the small area may be set at approximately 41 pixels×41 pixels (Rd=20 in the expressions #1 and #2).

[Expression 1]
$$\text{standard deviation } \sigma y \text{ of luminance } Y = \sqrt{\frac{\sum_{y=yc-Rd}^{yc+Rd}\left\{\sum_{x=xc-Rd}^{xc+Rd}(Y(x,y)-\overline{Y})^2\right\}}{(2R+1)^4}}$$

[Expression 2]
$$\text{average } \overline{Y} \text{ of luminance } Y = \frac{\sum_{y=yc-Rd}^{yc+Rd}\left\{\sum_{x=xc-Rd}^{xc+Rd}Y(x,y)\right\}}{(2R+1)^2}$$

In each large area 1-4, the coordinates of the center of a small area having the maximum standard deviation is regarded as a central position (xc, yc) where the cross-correlation coefficient cc should be obtained. A position difference (xd, yd) between a pixel of the slit-beamed image in the vicinity of the central position and a pixel of the slit-beamless image in the vicinity of the central position is defined, and a cross-correlation coefficient cc(xd, yd) at each position difference (xd, yd) is calculated. The position difference (xd, yd) giving the maximum cross-correlation coefficient can be regarded as the shift amount.

In the following expression #3, the position difference between a pixel of the slit-beamed image and a pixel of the slit-beamless image is expressed as "(xd, yd)", the luminance of the pixel of the slit-beamed image is expressed as "Y1", and that in the slit-beamless image is expressed as "Y2". In the case where the image size is approximately 1200 pixels×1600 pixels, the range (area) for obtaining the cross-correlation coefficient cc may also be set at approximately 41 pixels×41 pixels (Rc=20).

[Expression 3]
$$CC(xd, yd) = \frac{\frac{1}{(2Rc+1)^2}\sum_{y=yc-Rc}^{yc+Rc}\left\{\sum_{x=xc-Rc}^{xc+Rc}(Y1(x,y)-\overline{Y1})(Y2(x+xd,y+yd)-\overline{Y2})\right\}}{\sqrt{\frac{\sum_{y=yc-Rc}^{yc+Rc}\left\{\sum_{x=xc-Rc}^{xc+Rc}(Y1(x,y)-\overline{Y1})^2\right\}}{(2Rc+1)^4}}\sqrt{\frac{\sum_{y=yc-Rc}^{yc+Rc}\left\{\sum_{x=xc-Rc}^{xc+Rc}(Y2(x+xd,y+yd)-\overline{Y2})^2\right\}}{(2Rc+1)^4}}}$$

The explanation will be continued referring again to FIG. 7. After the shift amount between the slit-beamed image and the slit-beamless image is calculated as explained above (S701), search parameters specifying a search range, in which the locus 72a of the second slit beam is extracted, are set (S702). FIG. 12(a) is a schematic diagram showing a captured image of the document P onto which the slit beams are projected. As shown in FIG. 12(a), the search parameters include a position cX2 in the ccdx direction (on the locus 72a of the second slit beam) and positions yMin2 and yMax2 specifying a range in the ccdy direction.

For example, in the case where the image size is 1200 pixels (width W)×1600 pixels (height H), the position cX2 is set at the center of the width W of the captured image (chain line in FIG. 12(a)), that is, cX2=599. The range yMin2-yMax2 is set at 0-799 to specify an area as the upper half of the captured image.

Only one position cX2 is set regarding the ccdx direction for the following reason. In this embodiment, a curvature φ is calculated by use of the locus 71a of the first slit beam, and thus only one locus coordinate on the ccdy axis is needed to be extracted as the locus 72a of the second slit beam in order to obtain a lean θ (rotation angle around an X-axis in the real space).

After setting the search parameters (S702), the slit beam barycenter position calculation process (explained later) is executed (S703). Subsequently, the slit-beamless image is searched to judge whether a pixel corresponding to the pixel at the barycenter position calculated by the slit beam barycenter position calculation process (S703) exists in the slit-beamless image or not (S704).

Assuming that a pixel of the slit-beamed image as a pixel representing a slit beam is detected at (xp, yp) in the large area 4 as shown in FIG. 13, for example, a pixel corresponding to the detected pixel is searched for within a range:

$$xp+dx4-Rs \leq x \leq xp+dx4+Rs$$

$$yp+dy4-Rs \leq y \leq yp+dy4+Rs$$

considering the shift amount (dx4, dy4) of the large area 4 which has been calculated in the step S701.

Incidentally, when the distance from the subject is approximately 350 mm and the image size is approximately 1200 pixels×1600 pixels, the camera shake amount is several tens of pixels and thus "Rs" may be set at several tens of pixels.

If a corresponding pixel is found in the slit-beamless image by the search (S705: YES), it means that the pixel exists both in the slit-beamed image and in the slit-beamless image, that is, the pixel detected from the slit-beamed image can not be judged as a pixel representing a slit beam. Therefore, the pixel in the vicinity of the calculated barycenter position is excluded from the targets of extraction (S706) and thereafter the sequence of S703-S705 is repeated.

On the other hand, if no corresponding pixel is found in the slit-beamless image (S705: NO), the pixel is judged to be a pixel unique to the slit-beamed image (not existing in the slit-beamless image), that is, a pixel representing a slit beam, and thus the calculated barycenter position is stored in the slit beam locus information storage unit 436 (S707).

Subsequently, search parameters specifying another search range, in which the locus 71a of the first slit beam is extracted, are set (S708). The search parameters include positions yMin1 and yMax1 specifying a range in the ccdy direction as shown in FIG. 12(a).

Specifically, the range yMin1-yMax1 is set at 955-1599 to specify an area inside the lower half of the captured image. The range yMin1-yMax1 is not set to specify all the lower half of the captured image for the following reason. Since the first slit beam 71 is emitted from below the imaging lens 31 and in parallel with the optical axis of the imaging lens 31 in this embodiment, the range in which the first slit beam 71 can exist can be calculated back from the distance between the document P and the imaging lens 31 allowed in the shooting of the document P. Therefore, the search range may previously be narrowed down for realizing high-speed processing. Meanwhile, in the ccdx direction, a range is set at cXmin-cXmax.

After setting the search parameters (S708), a variable cX representing a detecting position in the ccdx direction is set at cXcmin (S709) and steps S711-S715 are executed similarly to the aforementioned steps S703-S708 in order to determine the barycenter position of pixels representing the slit beam at the detecting position within the range yMin1-yMax1 in the ccdy direction. After the steps S711-S715 at cX=cXcmin are finished as above, the variable cX is incremented by dx (S716) and the steps S711-S715 are repeated at the new detecting position cX=cX+dx. The repetition is continued until the variable reaches cXcmax (S710).

After the barycenter position of pixels representing the slit beam is calculated for every detecting position in the ccdx direction between cXcmin and cXcmax (S710: NO), an approximated curve calculation process (S717) is executed. In the approximated curve calculation process, the barycenter position of pixels representing the slit beam is obtained for each detecting position in remaining ranges in the ccdx direction. After the step S717 is finished, the slit beam locus extraction process of FIG. 7 is ended.

Next, the aforementioned slit beam barycenter position calculation process (S703 and S711 in FIG. 7) will be explained specifically referring to a flow chart of FIG. 8. FIG. 8 is a flow chart of the slit beam barycenter position calculation process included in the slit beam locus extraction process.

The position of a pixel detected as a pixel representing a slit beam does not necessarily coincide with the position of the center of the slit beam's luminance due to the characteristics of the laser beam forming the slit beam and slight undulations of the surface of the subject. Therefore, the slit beam barycenter position calculation process is executed for obtaining the barycenter position of the Rd·Y value in a prescribed range (area) around the detected pixel and regarding the obtained barycenter position as the position of the pixel representing the slit beam.

Regarding the prescribed range, xRange=2 in the ccdx direction and gRange=5 in the ccdy direction are set in this embodiment as shown in FIG. 12(b).

At the start of the slit beam barycenter position calculation process, values xMin and xMax representing a search range in the ccdx direction is set regarding the given variable cX (S801). The value xMin is set at a minimum value cXmin when the variable cX is at its minimum cXmin (=the initial value=0), and is set at cX-xRange in other cases. The value xMax is set at the maximum value cXmax (=1200) of the variable cX when the variable cX is at the maximum cXmax, and is set at cX+xRange in other cases. Therefore, cX2 is given as the variable cX in the step S703 while cXcmin is given as the variable cX in the step S709.

After setting the search range in the ccdx direction (S801), the red difference value Rd and the luminance value Y are calculated for each pixel within a range (area): xMin <ccdx ≤xMax, yMin≤ccdy≤yMax (S802, S803). Subsequently, the Rd·Y value is calculated for each pixel by multiplying the obtained red difference value Rd and luminance value Y together and the result is stored in the subject pixel value temporary storage unit 433 (S804).

Subsequently, a variable ccX, representing a detecting position within the ±xRange of the given variable cX, is initialized (=xMin) (S805), and whether the variable ccX is still within the search range (ccX≦xMax) or not is judged (S806). If the variable ccX is within the search range (S806: YES), whether the variable ccX is also within an image range (0≦ccX, ccX<cMAX) or not is judged (S807). If the variable ccX is also within the image range (S807: YES), the Rd·Y values of pixels in the search range which have been stored in the subject pixel value temporary storage unit 433 are referred to and a pixel having the maximum Rd·Y value that is higher than a prescribed threshold value vTh is searched for (S808).

The process is executed as above since the pixel having the maximum Rd·Y value is extremely likely to be a pixel representing the slit beam in the search range as mentioned above. The condition that the maximum Rd·Y value of the pixel should be higher than the threshold value vTh is employed for the following reason. Even when a pixel has the maximum Rd·Y value, the pixel has a possibility of being representing a slit beam projected on another object far from the subject (the luminance is very low in this case) if the maximum Rd·Y value is not higher than the threshold value vTh. The condition is used for detecting pixels representing the slit beams with high accuracy by excluding such a pixel having an Rd·Y value not higher than the threshold value vTh from the candidates.

After a pixel having the maximum Rd·Y value higher than the threshold value vTh is found inside the search range (S808), the barycenter position regarding the Rd·Y value within the ±gRange of the position of the found pixel is calculated (S809). Subsequently, the detecting position is updated (S810) and the above sequence from S806 to S810 is repeated.

When the barycenter calculation for the positions (variables ccX) within the ±xRange of cX is judged to be finished (S806: NO), a barycenter position regarding the ccdy direction is obtained by use of the Rd·Y value and the barycenter position obtained for each ccX within the ±xRange of cX, and the obtained barycenter position is regarded as a ccdy value (Yg) of the slit beam locus at the position cX (S811). After the step S811 is finished, the slit beam barycenter position calculation process of FIG. 8 is ended.

Incidentally, the barycenter position Yg is obtained by use of the following expression #4.

$$\text{barycenter position } Yg = \frac{\frac{1}{2*gRange+1}\sum_{y=rdyMax-gRange}^{YrdyMax+gRange}(Rd*Y)*y}{\frac{1}{2*gRange+1}\sum_{y=rdyMax-gRange}^{YrdyMax+gRange}(Rd*Y)} \quad \text{[Expression 4]}$$

In the above method for detecting the pixels representing the slit beams, even when each pixel representing a slit beam is contained in an illumination reflecting part S, the Rd·Y value is low (due to a low red value R) in the illumination reflecting part S and thus the difference between the illumination reflecting part S and the pixel (representing a slit beam) having the maximum Rd·Y value becomes distinct, by which the pixels representing the slit beams can be detected with high accuracy.

Further, even when each pixel representing a slit beam is contained in a printed part I having the R component, the Rd·Y value is low (due to a low luminance value Y) in the printed part I having the R component and thus the difference between the printed part I having the R component and the pixel (representing a slit beam) having the maximum Rd·Y value becomes distinct, by which the pixels representing the slit beams can be detected with high accuracy.

Figure 12:
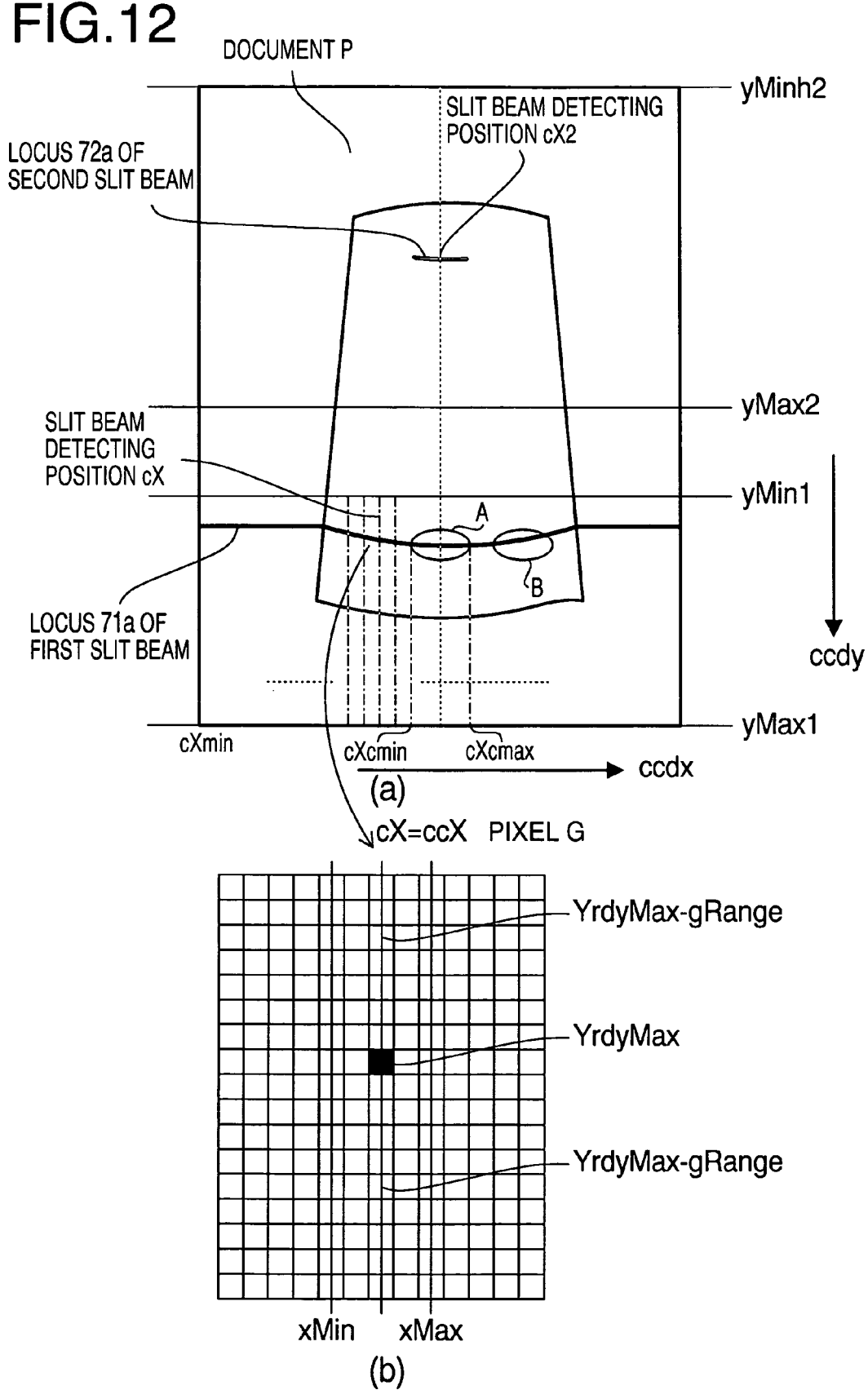

By the slit beam barycenter position calculation process explained above, the barycenter position of pixels representing a slit beam is calculated for each detecting position in the ccdx direction between cXcmin and cXcmax. FIG. 14 is an enlarged view of a part A which is shown in FIG. 12(*a*). As shown in FIG. 14, nine detecting positions in the ccdx direction between cXcmin and cXcmax (including a detecting position at the image center, four detecting positions to the left of the image center, and four detecting positions to the right of the image center) are set in this embodiment, and the barycenter position of pixels representing a slit beam is calculated for each of the detecting positions.

Next, the aforementioned approximated curve calculation process (S717 in FIG. 7) will be explained specifically referring to a flow chart of FIG. 9. FIG. 9 is a flow chart of the approximated curve calculation process included in the slit beam locus extraction process.

The approximated curve calculation process (S717) is a process for calculating an approximated curve regarding the locus 71*a* of the first slit beam from the barycenter positions (of pixels representing the slit beam) which have been obtained at the detecting positions in the ccdx direction between cXcmin and cXcmax and thereafter obtaining the barycenter position of pixels representing the slit beam for each detecting position in remaining ranges in the ccdx direction based on the approximated curve.

At the start of the approximated curve calculation process, the degree N of the approximated curve to be obtained is set at "1" (S901). If the degree N of the approximated curve is set higher at this point, the solution of the approximated curve can oscillate or diverge since the number of barycenter positions obtained in the steps S711-S715 is small (nine in this embodiment). To avoid such oscillation or divergence, the degree N of the approximated curve is first set at "1".

After setting the degree N of the approximated curve (S901), an approximated curve y=f(x) is obtained from the barycenter positions (regarding a plurality of pixels) stored in the slit beam locus information storage unit 436 in the step S715 (S902). When a measured value y is dependent on m−1 variables x^1, x^2, . . . x^(m−1), the approximated curve is obtained in the form of a linear combination expression y=a(0)+a(1)*x^1+a(2)*x^2+ . . . +a(m−1)*x^(m−1).

Since barycenter position data as the basis of the calculation of the approximated curve have already been obtained based on the pixels detected within the range cXcmin-cXcmax including the central part of the locus 71*a* of the first slit beam (within the image range cXMin-cXMax in the ccdx direction) in the steps S709-S716, an approximated curve along the locus 71*a* of the first slit beam on the document P can be obtained with higher probability compared to cases where the approximated curve is calculated from barycenter positions obtained based on pixels detected in edge parts of the image, for example.

Specifically, the user shooting the document P (subject) generally places the document P in the central part of the captured image and thus each edge part of the image is likely to represent a background or an unnecessary object other than the document P. Therefore, the probability of successfully obtaining an approximated curve along the locus 71a of the first slit beam on the document P is low when the approximated curve is calculated based on pixels extracted from edge parts of the image. On the other hand, by calculating the approximated curve based on pixels detected in an area of the slit-beamed image including the central part of the locus 71a of the first slit beam as in this embodiment, the probability of successfully obtaining an approximated curve along the locus 71a of the first slit beam on the document P can be enhanced.

After calculating the approximated curve y=f(x), pixels at barycenter positions that are a threshold value cTh or more apart from the approximated curve y=f(x) are extracted (S903). In this embodiment, the third pixel from the left of FIG. 14 (which is a prescribed threshold value cTh or more apart from the approximated curve) is extracted. Incidentally, the prescribed threshold value cTh in this embodiment is set at ±2 mm from the approximated curve (approximately 11 pixels in units of dots, approximately twice the width (approximately 1 mm) of the slit beam on an X-Y plane (Z=0)).

Subsequently, the approximated curve y=f(x) calculated in the step S902 is updated based on barycenter positions of the remaining pixels other than the extracted pixels (S904), by which a more precise approximated curve regarding the locus 71a of the first slit beam can be obtained.

After updating the approximated curve (S904), variables "UndetectNos" ("lUndetectNo" for the left-hand side and "rUndetectNo" for the right-hand side), representing the consecutive number of times for which no pixel representing the slit beam is found, are set at "0" (S905).

Two variables lUndetectNo and rUndetectNo for the left-hand side and the right-hand side are set separately since the detecting position in this embodiment is set alternately in a left-hand side part and a right-hand side part sandwiching the range cXcmin-cXcmax in the ccdx direction.

When no pixel representing the slit beam is found at each detecting position, the variable UndetectNo (lUndetectNo or rUndetectNo) is incremented by "1" in step S919 or S913. When the variable UndetectNo is judged to exceed a prescribed threshold value udLimit in step S908 or S920, the following detection of pixels representing the slit beam is stopped since the locus of the slit beam is judged to have changed rapidly.

For example, when the document P as the subject is a filed document as shown in FIG. 16, unnecessary parts or objects can be captured in both edge parts of the image even though the user generally shoots the document P placing it in the central part of the image.

In such cases, the locus 71a of the first slit beam on the document P forms a curve that is substantially symmetrical with respect to the center of the image, while the locus changes irregularly in both edge parts of the image as shown in parts C in FIG. 16 depending on the status of the file. Meanwhile, the user, hoping to convert at least the document part of the image into an erect image, rarely hopes to also convert the edge parts of the image into the erect image.

Therefore, the detection of pixels representing the slit beam is executed only for the essential part (document part) while leaving out the detection in the edge parts of the image (in which the locus of the slit beam is likely to change rapidly) by counting the consecutive number of times for which no pixel representing the slit beam is found and stopping the detection when the count exceeds the prescribed threshold value udLimit, by which the slit beam locus extraction process is speeded up.

Subsequently, a variable clx representing a detecting position to the left of cXcmin in the ccdx direction and a variable crx representing a detecting position to the right of cXcmax in the ccdx direction are set (clx=cXcmin−dx, crx=cXcmax+dx) (S906). Specifically, a position that is a prescribed distance dx to the left of cXcmin in the ccdx direction is set as the first detecting position on the left-hand side, while a position that is the prescribed distance dx to the right of cXcmax in the ccdx direction is set as the first detecting position on the right-hand side.

Subsequently, in this embodiment, the detection is started at the first detecting position on the left-hand side and after the detection (at the first detecting position on the left-hand side) is finished, the detection at the first detecting position on the right-hand side is started. When the detection at the first detecting position on the right-hand side is finished, the detecting position is set at a position that is the prescribed distance dx to the left of the first detecting position on the left-hand side. The repetitive processing is continued until the detecting position clx on the left-hand side reaches cXmix and the detecting position crx on the right-hand side reaches cXmax (S907).

After the detecting position in the ccdx direction is set in S906 and the detecting position is judged to be within the image range in S907 as above (S907: YES), it is judged whether or not the detecting position clx on the left-hand side which has been set is not less than the minimum value cXmin of the image range or whether or not the variable lUndetectNo is smaller than the threshold value udLimit (S908).

If the detecting position clx on the left-hand side which has been set is less than the minimum value cXmin of the image range, the detection on the left-hand side is judged to be finished (S908: YES), and the process advances to the step S920 for the detection on the right-hand side. Meanwhile, if the variable lUndetectNo is larger than the threshold value udLimit, the detection at the detecting position is stopped as mentioned above and the process advances to the step S920.

On the other hand, if the detecting position clx on the left-hand side is not less than the minimum value cXmin of the image range or the variable lUndetectNo is smaller than the threshold value udLimit (S908: YES), the value of the approximated curve y =f(x) (which has been updated in S904) at the detecting position clx is calculated (S909), and a search range in the ccdy direction at the detecting position clx is set based on the calculated value (yMin=y−ySRange, yMax=y+ySRange) (S910). In this embodiment, the search range ySRange is set at approximately 12 pixels based on twice the width of the slit beam and a permissible gradient of the slit beam on the X-Y plane (Z=0) as shown in FIG. 15.

After the search range in the ccdy direction at the detecting position clx is set, steps S911-S914 are executed in order to detect pixels representing the slit beam within the search range similarly to the detecting method which has been explained above.

While the search range in the ccdy direction originally has to be set at yMin1-yMax1 as shown in FIG. 12(a), the detecting process can be speeded up by restricting the search range in the ccdy direction within ±ySRange of the approximated curve. Further, since pixels representing the slit beam are extremely likely to exist in the vicinity of the approximated curve, the possibility of false detection can be reduced by the restriction compared to the case where the whole range yMin1-yMax1 is searched.

After storing a barycenter position calculated in step S914 is stored in the slit beam locus information storage unit 436 (S914), the approximated curve y=f(x) which has been updated in S904 is updated again by use of the barycenter position of the pixels detected this time and the barycenter positions of the pixels detected in the past (S915), by which the precision of the approximated curve regarding the locus 71a of the first slit beam can be increased further. After the update of the approximated curve, the variable lUndetectNo is set at "0" (S916) and the detection at the detecting position clx is ended.

On the other hand, if a pixel corresponding to the pixel detected in the slit-beamed image is detected in the slit-beamless image (as the result of the search of the whole range yMIN-yMAX set in S910), that is, if no pixel representing the slit beam is detected (S918: YES), the variable lUndetectNo is incremented by "1" (S919) and the detection at the detecting position clx is ended.

After finishing the detection at the detecting position clx as above, the detection at the detecting position crx on the right-hand side is started. Steps S920-S931 executed at the detecting position crx on the right-hand side are equivalent to the steps S907-911 executed at the detecting position clx on the left-hand side, and thus repeated explanation thereof is omitted here.

After the detection at each detecting position is finished in the range between cXmix and cXcmin-dx in the ccdx direction (left-hand side) and in the range between cXcmax+dx and cXmax in the ccdx direction (right-hand side) as explained above, the approximated curve calculation process of FIG. 9 is ended.

Next, a process for obtaining the approximated curve y=f(x) by use of the barycenter positions of detected pixels (S902, S903, S915, S927 in the flow chart of FIG. 9) will be explained below referring to a flow chart of FIG. 10.

For obtaining the approximated curve y=f(x), an approximated curve y=f(x) of the N-th degree is obtained first by means of the least-squares method (S1001). In the step S904, an approximated curve y=f(x) of the 1st degree is obtained first. Subsequently, the standard deviation σa of errors between the approximated curve and the barycenter positions of the detected pixels is calculated (S1002) and whether the calculated standard deviation σa is larger than a prescribed threshold value aTh or not is judged (S1003). In this embodiment, the prescribed threshold value aTh is set at approximately 3.54 pixels (=2σy in units of pixels where σ is the standard deviation of the width of the slit beam (approximately 1 mm) on the X-Y plane (Z=0)). If the standard deviation σa is smaller than the threshold value aTh (S1003: NO), the currently set degree N is employed as the degree of the approximated curve without increasing the degree N.

On the other hand, if the standard deviation σa is the threshold value aTh or more (S1003: YES), whether or not the currently set degree N is a prescribed threshold value nTh or higher is judged (S1004). In this embodiment, the prescribed threshold value nTh is set at 5 assuming the surface configuration of one of two facing pages (3rd degree or higher). If the degree N is the prescribed threshold value nTh or higher (S1004: YES), the currently set degree N is employed as the degree of the approximated curve without increasing the degree N. If the degree N is lower than the prescribed threshold value nTh (S1004: NO), the currently set degree N is incremented by "1" (S1005) and the steps S1001-S1004 are repeated with the degree N which has been incremented by "1".

By gradually increasing the degree N of the approximated curve on the update of the approximated curve as above, the approximated curve regarding the locus 71a of the first slit beam can be calculated precisely even when the document P has projections and depressions.

Next, the aforementioned triangulation calculation process (S160 in FIG. 5) will be explained specifically referring to FIGS. 17 and 18. In the triangulation calculation process (S160), peaks of the loci 71a and 71b of the first and second slit beams in the lengthwise direction are determined by barycenter calculation for each coordinate in the crosswise direction of the image data based on the pixel data loaded in the subject pixel value temporary storage unit 433, and a three-dimensional spatial position corresponding to each peak extraction coordinate is determined as explained below.

FIG. 17 is a schematic diagram for explaining the slit-beamed image. FIG. 18 is a schematic diagram for explaining a method for calculating the three-dimensional spatial positions of the slit beams. A coordinate system of the image capturing device 1 with respect to the document P (curved in the crosswise direction) being shot as shown in FIG. 18 is defined as follows. The optical axis direction of the imaging lens 31 is defined as a Z-axis. A position that is a reference distance VP away from the image capturing device 1 is defined as the origin of X, Y and Z-axes. A horizontal direction and a vertical direction with respect to the image capturing device 1 are defined as the X-axis and the Y-axis, respectively.

The number of pixels of the CCD image sensor 32 in the X-axis direction will be called "ResX" and that in the Y-axis direction will be called "ResY". The upper end, lower end, left end and right end of the CCD image sensor 32 projected on the X-Y plane through the imaging lens 31 will be called "Yftop", "Yfbottom", "Xfstart" and "Xfend". The distance from the optical axis of the imaging lens 31 to the optical axis of the first slit beam 71 emitted from the slit beam projection unit 20 is assumed to be "D". The position of an intersection point of the first slit beam 71 and the X-Y plane measured in the Y-axis direction will be called "las1". The position of an intersection point of the second slit beam 72 and the X-Y plane measured in the Y-axis direction will be called "las2".

Under the above definitions, a three-dimensional spatial position (X1, Y1, Z1) corresponding to coordinates (ccdx1, ccdy1) of an attention point 1 (when a pixel of the image of the locus 71a of the first slit beam is paid attention to) on the CCD image sensor 32 is figured out from solutions of the following five simultaneous equations regarding triangles formed by the point on the imaging surface of the CCD image sensor 32, the emission point of the first and second slit beams 71 and 72, and intersection points with the X-Y plane.

$$Y1=-((las1+D)/VP)Z1+las1 \tag{1}$$

$$Y1=-(Ytarget/VP)Z1+Ytarget \tag{2}$$

$$X1=-(Xtarget/VP)Z1+Xtarget \tag{3}$$

$$Xtarget=Xfstart+(ccdx1/ResX)\times(Xfend-Xfstart) \tag{4}$$

$$Ytarget=Yftop-(ccdy1/ResY)\times(Yftop-Yfbottom) \tag{5}$$

Incidentally, las1=−D and thus Y1=−D in this embodiment since the first slit beam 71 is parallel to the Z-axis.

Similarly, a three-dimensional spatial position (X2, Y2, Z2) corresponding to coordinates (ccdx2, ccdy2) of an attention point 2 (when a pixel of the image of the locus 72a of the second slit beam is paid attention to) on the CCD image sensor 32 is figured out from solutions of the following five simultaneous equations.

$$Y2=-((las2+D)/VP)Z2+las2 \quad (1)$$

$$Y2=-(Y\text{target}/VP)Z2+Y\text{target} \quad (2)$$

$$X2=-(X\text{target}/VP)Z2+X\text{target} \quad (3)$$

$$X\text{target}=X\text{fstart}+(ccdx2/ResX)\times(X\text{fend}-X\text{fstart}) \quad (4)$$

$$Y\text{target}=Y\text{ftop}-(ccdy2/ResY)\times(Y\text{ftop}-Y\text{fbottom}) \quad (5)$$

The three-dimensional spatial positions of the slit beams calculated as above are written into the triangulation calculation result storage unit 434, by which the triangulation calculation process is ended.

Next, the aforementioned document attitude calculation process (S170 in FIG. 5) will be explained specifically referring to FIG. 19. FIG. 19 is a schematic diagram for explaining a coordinate system used in the document attitude calculation.

The document attitude calculation process (S170) is executed as follows, for example. A curve is obtained by executing regression curve approximation to points at the three-dimensional spatial positions corresponding to the locus 71*a* of the first slit beam based on the data stored in the triangulation calculation result storage unit 434, and a straight line connecting a point on the curve where the position in the X-axis direction is "0" and a three-dimensional spatial position on the locus 72*a* of the second slit beam where the position in the X-axis direction is "0" is assumed. An intersection point of the straight line and the Z-axis (i.e. an intersection point of the optical axis and the document P) is obtained as a three-dimensional spatial position (0, 0, L) of the document P (see FIG. 19(*a*)), and the angle of the straight line with respect to the X-Y plane is obtained as a lean θ of the document P around the X-axis.

Meanwhile, a state in which the curve obtained by the regression curve approximation of the locus 71*a* of the first slit beam is rotated by −θ (θ: the lean of the document P around the X-axis obtained above), that is, a state in which the document P is placed in parallel with the X-Y plane, is assumed as shown in FIG. 19(*b*). Subsequently, a cross section of the document P on the X-Z plane is considered as shown in FIG. 19(*c*). In the sectional form of the document P in the X-axis direction, displacements of the cross section in the Z-axis direction are obtained for a plurality of positions in the X-axis direction. Based on the displacements, curvature φ(X) indicating the gradient with respect to the X-axis direction is obtained as a function of the position X in the X-axis direction, by which the document attitude calculation process is ended.

Next, the aforementioned plane conversion process (S180 in FIG. 5) will be explained specifically referring to FIG. 20. FIG. 20 is a flow chart showing the plane conversion process.

At the start of the plane conversion process, a processing area for this process is reserved in the working area 436 of the RAM 43 and a variable as a counter "b" used for this process is set to an initial value (b=0) (S1300).

Subsequently, based on the position L, the lean θ and the curvature φ(x) of the document P which have been obtained by the calculations by the document attitude calculation program 425, a rectangular area formed by four points that are obtained by transforming (rotating around the Y-axis by the curvature φ(x), rotating around the X-axis by the lean θ, and shifting in the Z-axis direction by the position L) the four corner points of the slit-beamless image stored in the slit-beamless image storage unit 432 (i.e. a rectangular area as an image of a surface of the document P on which characters, etc. are drawn or printed, viewed substantially in the orthogonal direction) is set, and the number "a" of pixels contained in the rectangular area is obtained (S1301).

Subsequently, coordinates on the slit-beamless image corresponding to each of the pixels forming the rectangular area set in S1301 are obtained and pixel information on each pixel of the plane image is set based on pixel information around the coordinates, as explained below. First, whether the counter "b" has reached the number "a" of pixels or not is judged (S1302). If the counter "b" has not reached the number "a" of pixels (S1302: NO), a pixel forming the rectangular area is rotated around the Y-axis by the curvature φ(x) (S1304), rotated around the X-axis by the lean θ (S1305), and shifted in the Z-axis direction by the distance L (S1306). A three-dimensional spatial position obtained as above is converted into coordinates (ccdcx, ccdcy) on a CCD image captured by an ideal camera according to the aforementioned relational expressions of triangulation (S1307), and the coordinates (ccdcx, ccdcy) are converted into coordinates (ccdx, ccdy) on a CCD image captured by the actual camera by means of a well-known calibration technique based on aberration characteristics of the imaging lens 31 being used (S1308). The state of a pixel of the slit-beamless image at the position is obtained and stored in the working area 436 of the RAM 43 (S1309). Thereafter, the counter is incremented by "1" in order to execute the above sequence S1303-S1309 for the next pixel (S1309).

After the sequence S1303-S1309 is repeated until the counter "b" reaches the number "a" of pixels (S1302: YES), the processing area reserved in the working area 436 for the execution of this process is released (S1311) and the plane conversion process is ended.

As explained above, the image capturing device 1 in the "corrective imaging mode" projects the two slit beams (the first and second slit beams 71 and 72) onto the document P, captures an image of the document P by letting the imaging lens 31 focus the image on the CCD image sensor 32, and thereafter captures another image of the document P with no slit beams projected thereon.

Subsequently, when the locus of a slit beam is extracted from the slit-beamed image (one of the two captured images, shot with the slit beams projected on the document P), part of the pixels forming the locus of the slit beam are detected, and an approximated curve regarding the locus of the slit beam is calculated based on the detected pixels.

Since the search range in the ccdy direction (for detecting the remainder of the pixels forming the locus of the slit beam) is restricted based on the approximated curve, the process for detecting the pixels forming the locus of the slit beam can be speeded up as a whole. Further, since the search is executed only within a range extremely likely to include a pixel representing the slit beam, the possibility of false detection (detecting a pixel not forming the slit beam) can be reduced, by which the locus of the slit beam can be extracted with high accuracy.

After extracting the loci of the slit beams as above, the image capturing device 1 calculates the three-dimensional spatial position of each part of the loci of the slit beams according to the triangulation principle, determines the position, lean and curvature (three-dimensional shape data) of the document P based on the calculated three-dimensional spatial positions, and writes the obtained three-dimensional shape data and the image data of the slit-beamless image into the memory card 55.

Therefore, with the image capturing device 1, the user is allowed to store image data, that has been corrected as if a flat document P were shot from its front, in the card memory 55 even when the user is shooting a deformed (e.g. curved) document P from an oblique direction, by switching the mode selection switch 59 to the "corrective imaging mode", checking through the finder 53 or the LCD 51 whether a desired range of the document P has been fit in the shooting frame, and shooting the image by pressing the release button 52.

Incidentally, the image data stored in the card memory 55 can be used in various ways, such as checking the results of shooting by letting the LCD 51 display the images stored in the card memory 55, removing the card memory 55 from the image capturing device 1 and letting an external personal computer display or print the images stored in the card memory 55, etc.

While the present invention has been illustrated above with reference to the embodiment, in can easily be inferred that the present invention is not to be restricted by the above embodiment and various improvements and modifications are possible without departing from the scope and spirit of the present invention.

For example, while the slit beams having the red component as the main component are extracted in the above embodiment, the component to be regarded as the main component is not limited to the red component; slit beams having the green component or blue component as the main component may also be extracted. In the case where slit beams having the green component as the main component (instead of the slit beams having the red component as the main component) are extracted, for example, a green difference value $Gd(=G-(R+B/2))$ may be calculated instead of the red difference value $Rd(=R-(G+B/2))$ and a $Gd \cdot Y$ value may be employed instead of the $Rd \cdot Y$ value.

While the red difference value Rd in the above embodiment is calculated by subtracting the average of the green value G and the blue value B from the red value R, the red difference value Rd may also be calculated by subtracting a weighted average of the green value G and the blue value B from the red value R. For example, the red difference value Rd may be obtained by an expression $Rd=R-(2 \cdot G+1 \cdot B)/3$.

The subject being shot by the image capturing device 1 is not restricted to a sheet-like document P but can also be a smooth surface of a solid block or, depending on the situation, a surface of an object having ridge lines. The effect of detecting the three-dimensional shape of a subject can be achieved equally for any purpose seeking to figure out a three-dimensional shape in a three-dimensional space based on loci of substantially two slit beams.

However, if the subject is a sheet-like document P as in the above embodiment, it is possible to estimate the shape of the whole document P by regarding the locus 71a of the first slit beam as a sectional form of the document P and thereby carry out the image correction in regard to deformation (e.g. curvature) of the document P. Further, when the subject has a three-dimensional shape substantially uniform in a direction orthogonal to the longitudinal direction of the slit beams, it is unnecessary to consider a shift in the detecting attitude due to peculiar shapes (protrusions, etc.) of parts of the subject onto which the slit beams are projected, by which the user is relieved of the need of being careful about the parts onto which the slit beams are projected.

While the slit beam projection unit 20 is configured to output two slit beams (the first and second slit beams 71 and 72) in the image capturing device 1 of the above embodiment, the number of outputted slit beams is not restricted to two, that is, the image capturing device may be configured to output three or more slit beams. For example, the slit beam projection unit 20 may be configured so that a third slit beam (in addition to the first and second slit beams 71 and 72) similar to the second slit beam 72 will be projected onto a part of the document P above the second slit beam 72 as depicted in FIG. 17(b) showing a locus image of the slit beams on the document P. With such a configuration, a curved shape of the document P in its lengthwise direction can also be estimated based on the positions of points on the loci of the first through third slit beams, by which an image still easier to see can be generated by the correction of the slit-beamless image.

While the laser diode 21 emitting a red laser beam is used as the light source in the above embodiment, a light source of any type (plane emission laser, LED, EL device, etc.) can be employed as long as an optical beam can be outputted.

The transparent flat plate 24 may be replaced with a transparent flat plate having a surface provided with a diffraction grating diffracting a prescribed ratio of the power of the incident laser beam in a particular direction. With the transparent flat plate having such a diffraction grating, a 0th order laser beam passing through the diffraction grating and a 1st order laser beam diffracted by the diffraction grating can be used as the first and second slit beams 71 and 72, respectively.

The shape of each slit beam outputted by the slit beam projection unit 20 is not restricted to a thin line extremely narrowed in a direction orthogonal to its longitudinal direction but can be a stripe-like beam pattern having a certain width. Specifically, in addition to the slit beams illustrated in the above embodiment, various geometric patterns (stripe pattern, block form pattern, dot pattern, etc.) can be employed for pattern light. By extracting continuity of loci of boundary lines or barycenter positions of such patterns by use of approximate functions, the effects described above in detail can be achieved similarly.

The positional relationship between the first and second slit beams 71 and 72 may be inverted, that is, the optical elements may be arranged so that the second slit beam 72 will be formed in the first direction (below the first slit beam 71 when viewed from the image capturing device 1) and the first slit will be formed in the second direction.

While the image capturing device 1 is configured to capture the slit-beamed image and the slit-beamless image by use of the imaging lens 31 and the CCD image sensor 32, the image capturing device may be provided with extra imaging lens and CCD image sensor for capturing the slit-beamed image in addition to the imaging lens 31 and the CCD image sensor 32. With such a configuration, the time lag between the capturing of the slit-beamed image and the capturing of the slit-beamless image (time for the transfer of image data from the CCD image sensor 32, etc.) can be eliminated, by which deviation of the imaging range of the slit-beamless image from that of the slit-beamed image can be eliminated and the three-dimensional shape of the subject can be detected more precisely. However, compared to this example, the image capturing device 1 of the above embodiment is capable of realizing a reduced size, price, and number of components.

In an embodiment of the present invention, the first area setting means may be configured to set an area in the pattern light projection image including a central part of the locus of the pattern light as the first area including a part of the locus of the pattern light.

In the three-dimensional shape detecting device configured as above, the first area setting means sets an area in the pattern light projection image including a central part of the locus of the pattern light as the first area. Generally, the user of the three-dimensional shape detecting device shoots the subject so that the subject will be placed in a central part of the captured image. Meanwhile, a background, unnecessary objects, etc. other than the subject are likely to be captured in both edge parts of the image. Therefore, the probability of successfully obtaining an approximated curve along the locus of the pattern light on the subject becomes low when the edge parts of the image are specified as the first area and the approximated curve is calculated based on pixels extracted from the first area. On the other hand, by setting an area in the pattern light projection image including a central part of the locus of the pattern light as the first area as in the above three-dimensional shape detecting device, an approximated curve along the locus of the pattern light on the subject can be obtained successfully.

In an embodiment of the present invention, the three-dimensional shape detecting device may further comprise: detecting position setting means which sets a plurality of detecting positions in the X-axis direction of the pattern light projection image for detecting the pixels forming the remaining part of the locus of the pattern light, from a position outside the first area toward an edge part of the pattern light projection image; second detecting means which detects the pixels forming the remaining part of the locus of the pattern light at each of the detecting positions set by the detecting position setting means; and first update means which updates the approximated curve calculated by the approximated curve calculation means, regarding each pixel detected by the second detecting means based on the pixel and the plurality of pixels detected by the first detecting means. In this case, the second area setting means may be configured to restrict a range in a Y-axis direction of the pattern light projection image at each of the detecting positions set by the detecting position setting means. The range in the Y-axis direction may be restricted based on the approximated curve calculated by the approximated curve calculation means at a detecting position first set by the detecting position setting means, while being restricted based on the approximated curve updated by the first update means at detecting positions set subsequently.

In the three-dimensional shape detecting device configured as above, the approximated curve calculated by the approximated curve calculation means is updated by the first update means in regard to each pixel detected by the second detecting means based on the pixel and the plurality of pixels detected by the first detecting means, by which the approximated curve regarding the locus of the pattern light can be calculated with high accuracy. After the approximated curve is updated, the second area setting means restricts the range in the Y-axis direction (for detecting the pixels forming the pattern light) based on the updated approximated curve, by which the detecting process for detecting the pixels representing the pattern light can be executed at high speed.

In an embodiment of the present invention, the detecting position setting means may be configured to set the detecting positions alternately in two areas on both sides of the first area.

In the three-dimensional shape detecting device configured as above, the detecting position setting means sets the detecting positions alternately in two areas on both sides of the first area, by which the approximated curve can be calculated with high accuracy especially for a locus of pattern light extending substantially symmetrically on both sides of the first area.

For example, in the extraction of such a locus of pattern light extending substantially symmetrically on both sides of the first area, if the detection of pixels is first executed throughout one of the two areas (area #1) sandwiching the first area and thereafter executed in the other area (area #2), a pixel representing the pattern light at the first detecting position in the area #2 can be a prescribed threshold distance or more apart from an approximated curve that is calculated based on the pixels detected in the area #1 (due to ill effect of locus detection in the area #1 on one side of the first area) and precise detection of the pixels representing the pattern light can become impossible. Such a problem can be eliminated by the above configuration.

In an embodiment of the present invention, the three-dimensional shape detecting device may further comprise: counting means which counts the number of times for which no pixel is detected by the second detecting means at each detecting position; judgment means which judges whether or not the number of times counted by the counting means exceeds a prescribed number of times at consecutive detecting positions; and stopping means which stops the detection by the second detecting means at subsequent detecting positions when the judgment means judges that the number of times counted by the counting means exceeds the prescribed number of times at consecutive detecting positions.

In the three-dimensional shape detecting device configured as above, the detection by the second detecting means at subsequent detecting positions is stopped by the stopping means when the number of times counted by the counting means is judged to exceed the prescribed number of times at consecutive detecting positions. Therefore, unnecessary detection can be left out and the process for extracting the locus of the pattern light can be speeded up.

In an embodiment of the present invention, the three-dimensional shape detecting device may further comprise: extracting means which extracts pixels that are a prescribed distance or more apart from the approximated curve calculated by the approximated curve calculation means in the Y-axis direction of the pattern light projection image from the plurality of pixels detected by the first detecting means. In this case, the locus of the pattern light may be extracted based on the plurality of pixels detected by the first detecting means, excluding the pixels extracted by the extracting means, and the pixels detected in the second area set by the second area setting means.

In the three-dimensional shape detecting device configured as above, the locus of the pattern light is extracted based on the plurality of pixels detected by the first detecting means, excluding the pixels extracted by the extracting means, and the pixels detected in the second area set by the second area setting means. Therefore, the locus of the pattern light can be extracted with higher accuracy compared to the case where all the pixels detected by the first detecting means are regarded as pixels forming the locus of the pattern light.

In an embodiment of the present invention, the three-dimensional shape detecting device may further comprise second update means which updates the approximated curve calculated by the approximated curve calculation means based on the plurality of pixels detected by the first detecting means excluding the pixels extracted by the extracting means. In this case, the second area setting means may be configured to restrict the range in the Y-axis direction at the detecting position first set by the detecting position setting means based on the approximated curve updated by the second update means.

In the three-dimensional shape detecting device configured as above, the approximated curve calculated by the approximated curve calculation means is updated based on the plurality of pixels detected by the first detecting means excluding the pixels extracted by the extracting means. Therefore, the accuracy of the approximated curve can be increased compared to the approximated curve calculated based on the pixels detected by the first detecting means. Further, the range in the Y-axis direction at the detecting position first set by the detecting position setting means is restricted based on the updated approximated curve, by which the range in the Y-axis direction can be restricted to a more appropriate range.

In an embodiment of the present invention, the first and second update means may be configured to calculate the approximated curve gradually increasing the degree of the approximated curve.

In the three-dimensional shape detecting device configured as above, the first and second update means calculates the approximated curve gradually increasing the degree of the approximated curve, by which the locus of the pattern light can be extracted with high accuracy even when the pattern light is projected on a subject having projections and depressions.

In an embodiment of the present invention, an image capturing device comprises: a three-dimensional shape detecting device configured as above; and plane image correction means which corrects a pattern light non-projection image of a subject, captured by the image capturing means of the three-dimensional shape detecting device with no pattern light projected on the subject, to a plane image viewing the subject from a direction substantially orthogonal to a prescribed surface of the subject based on the three-dimensional shape of the subject calculated by the three-dimensional shape calculation means of the three-dimensional shape detecting device.

With such an image capturing device, the pattern light non-projection image can be corrected to an accurate plane image based on the locus of the pattern light extracted by the three-dimensional shape detecting device with high accuracy.

In the above embodiment, the steps S709 and S710 in the flow chart of FIG. 7 correspond to the first area setting means or the first area setting step. The steps S711-S715 in the flow chart of FIG. 7 correspond to the first detecting means or the first detecting step. The step S902 in the flow chart of FIG. 9 corresponds to the approximated curve calculation means or the approximated curve calculation step. The steps S909 and S910 in the flow chart of FIG. 9 correspond to the second area setting means or the second area setting step.

The step S906 in the flow chart of FIG. 9 corresponds to the detecting position setting means. The steps S911-S914 and S923-S926 in the flow chart of FIG. 9 correspond to the second detecting means. The steps S915 and S927 in the flow chart of FIG. 9 correspond to the first update means.

The steps S919 and S931 in the flow chart of FIG. 9 correspond to the counting means. The steps S908 and S920 in the flow chart of FIG. 9 correspond to the judgment means and the stopping means.

The step S903 in the flow chart of FIG. 9 corresponds to the extracting means. The step S904 in the flow chart of FIG. 9 corresponds to the second update means.

What is claimed is:

1. A three-dimensional shape detecting device comprising a projection unit which projects pattern light, an image capturing unit which captures a pattern light projection image of a subject on which the pattern light is projected, and a three-dimensional shape calculation unit which calculates a three-dimensional shape of the subject based on a locus of the pattern light extracted from the pattern light projection image captured by the image capturing unit, wherein the three-dimensional shape detecting device further comprises:

a first area setting unit which sets a first area, including a first portion of the locus of the pattern light extending in an X-axis direction of the pattern light projection image, in the pattern light projection image;

a first detecting unit which detects a plurality of pixels forming the first portion of the locus of the pattern light in the first area set by the first area setting unit;

an approximated curve calculation unit which calculates an approximated curve regarding the first portion of the locus of the pattern light based on the plurality of pixels detected by the first detecting unit; and a second area setting unit which sets a second area for detecting pixels forming a second portion of the locus of the pattern light in the pattern light projection image, based on the approximated curve calculated by the approximated curve calculation unit, wherein the extracted locus of the pattern light is based on the plurality of pixels detected by the first detecting unit and the pixels detected in the second area set by the second area setting unit and wherein the three-dimensional shape of the subject is based on the extracted locus.

2. The three-dimensional shape detecting device according to claim 1, wherein the first area setting unit sets an area in the pattern light projection image including a central part of the locus of the pattern light as the first area including the first portion of the locus of the pattern light.

3. The three-dimensional shape detecting device according to claim 1, further comprising:

a detecting position setting unit which sets a plurality of detecting positions in the X-axis direction of the pattern light projection image for detecting the pixels forming the second portion of the locus of the pattern light, from a position outside the first area toward an edge part of the pattern light projection image;

a second detecting unit which detects the pixels forming the second portion of the locus of the pattern light at each of the detecting positions set by the detecting position setting unit; and a first update unit which updates the approximated curve calculated by the approximated curve calculation unit, in regard to each pixel detected by the second detecting unit based on the pixel and the plurality of pixels detected by the first detecting unit, wherein:

the second area setting unit restricts a range in a Y-axis direction of the pattern light projection image at each of the detecting positions set by the detecting position setting unit, and the range in the Y-axis direction is restricted based on the approximated curve calculated by the approximated curve calculation unit at a detecting position first set by the detecting position setting unit, while being restricted based on the approximated curve updated by the first update unit at detecting positions set subsequently.

4. The three-dimensional shape detecting device according to claim 3, wherein the detecting position setting unit sets the detecting positions alternately in two areas on both sides of the first area.

5. The three-dimensional shape detecting device according to claim 3, further comprising:
 a counter which counts the number of times for which no pixel is detected by the second detecting unit at each detecting position;
 a judgment unit which judges whether or not the number of times counted by the counter exceeds a prescribed number of times at consecutive detecting positions; and
 a stopping unit which stops the detection by the second detecting unit at subsequent detecting positions when the judgment unit judges that the number of times counted by the counter exceeds the prescribed number of times at consecutive detecting positions.

6. The three-dimensional shape detecting device according to claim 5, further comprising:
 an extracting unit which extracts pixels that are a prescribed distance or more apart from the approximated curve calculated by the approximated curve calculation unit in the Y-axis direction of the pattern light projection image from the plurality of pixels detected by the first detecting unit, wherein:
 the extracted locus of the pattern light is based on the plurality of pixels detected by the first detecting unit, excluding the pixels extracted by the extracting unit, and the pixels detected in the second area set by the second area setting unit.

7. The three-dimensional shape detecting device according to claim 6, further comprising a second update unit which updates the approximated curve calculated by the approximated curve calculation unit based on the plurality of pixels detected by the first detecting unit excluding the pixels extracted by the extracting unit, wherein:
 the second area setting unit restricts the range in the Y-axis direction at the detecting position first set by the detecting position setting unit based on the approximated curve updated by the second update unit.

8. The three-dimensional shape detecting device according to claim 7, wherein the first and second update units calculate the approximated curve gradually increasing the degree of the approximated curve.

9. An image capturing device comprising:
 the three-dimensional shape detecting device according to claim 1; and
 a plane image correction unit which corrects a pattern light non-projection image of a subject, captured by the image capturing unit of the three-dimensional shape detecting device with no pattern light projected on the subject, to a plane image viewing the subject from a direction substantially orthogonal to a prescribed surface of the subject based on the three-dimensional shape of the subject calculated by the three-dimensional shape calculation unit of the three-dimensional shape detecting device.

10. A computer program embodied on a computer-readable medium for calculating a three-dimensional shape of a subject based on a locus of pattern light extracted from a pattern light projection image of the subject captured with pattern light projected on the subject, the computer program product comprising computer-readable instructions that cause a computer to execute:
 a first area setting program segment for setting a first area, including a first portion of the locus of the pattern light, in the pattern light projection image;
 a first detecting program segment for detecting pixels forming the first portion of the locus of the pattern light in the first area set by the first area setting program segment;
 an approximated curve calculation program segment for calculating an approximated curve regarding the first portion of the locus of the pattern light based on the pixels detected by the first detecting program segment; and
 a second area setting program segment for setting a second area for detecting pixels forming a second portion of the locus of the pattern light in the pattern light projection image, based on the approximated curve calculated by the approximated curve calculation program segment, wherein:
 the extracted locus of the pattern light is based on the pixels detected by the first detecting program segment and the pixels detected in the second area set by the second area setting program segment and the three-dimensional shape of the subject is based on the extracted locus.

11. A computerized method for calculating a three-dimensional shape of a subject based on a locus of pattern light extracted from a pattern light projection image of the subject captured with pattern light projected on the subject, the method comprising:
 setting a first area, including a first portion of the locus of the pattern light in the pattern light projection image;
 detecting pixels forming the first portion of the locus of the pattern light in the first area set in the first area setting step;
 calculating an approximated curve regarding the first portion of the locus of the pattern light based on the pixels detected in the detecting step; and
 setting a second area, including a second portion of the locus of the pattern light in the pattern light projection image, based on the approximated curve calculated in the approximated curve calculation step;
 detecting pixels forming the second portion of the locus of the pattern light in the second area set in the second area setting step, wherein:
 the extracted locus of the pattern light is based on the pixels detected in the detecting step and the pixels detected in the second area set in the second area setting step and the three-dimensional shape of the subject is based on the extracted locus.

* * * * *